(12) United States Patent
    Mukae

(10) Patent No.: US 8,164,233 B2
(45) Date of Patent: Apr. 24, 2012

(54) DRIVE APPARATUS

(75) Inventor: Hideaki Mukae, Hyogo (JP)

(73) Assignee: Panasonic Corporation, Osaka (JP)

( * ) Notice: Subject to any disclaimer, the term of this patent is extended or adjusted under 35 U.S.C. 154(b) by 620 days.

(21) Appl. No.: 12/438,083

(22) PCT Filed: Aug. 27, 2007

(86) PCT No.: PCT/JP2007/066579
§ 371 (c)(1),
(2), (4) Date: Feb. 19, 2009

(87) PCT Pub. No.: WO2008/026552
PCT Pub. Date: Mar. 6, 2008

(65) Prior Publication Data
US 2010/0171392 A1    Jul. 8, 2010

(30) Foreign Application Priority Data

Aug. 28, 2006 (JP) ................................. 2006-230248
Sep. 6, 2006 (JP) ................................. 2006-241946

(51) Int. Cl.
*H01L 41/08* (2006.01)
(52) U.S. Cl. ......... 310/323.01; 310/316.01; 310/316.02; 310/317
(58) Field of Classification Search ........... 310/323.01–323.21, 328, 311, 310/316.01–316.02, 317, 338, 366–365; H01L 41/08, 41/09
See application file for complete search history.

(56) References Cited

U.S. PATENT DOCUMENTS

| 5,416,375 | A | 5/1995 | Funakubo et al. |
| 5,453,653 | A | 9/1995 | Zumeris |
| 5,842,053 | A | 11/1998 | Ueyama et al. |
| 5,943,512 | A | 8/1999 | Hamada et al. |
| 6,091,179 | A | 7/2000 | Tobe et al. |
| 6,211,603 | B1 | 4/2001 | Iino et al. |

(Continued)

FOREIGN PATENT DOCUMENTS
JP       05-15693 U     2/1993
(Continued)

OTHER PUBLICATIONS

International Search Report for PCT/JP2007/066579.

*Primary Examiner* — Walter Benson
*Assistant Examiner* — Karen B Addison
(74) *Attorney, Agent, or Firm* — Pearne & Gordon LLP

(57) ABSTRACT

A drive apparatus includes a first, a second, and a third frame, and a first and a second drive mechanism. The second frame is supported movably in a first direction with respect to the first frame. The third frame is supported movably in a second direction that intersects the first direction with respect to the second frame. The first drive mechanism is provided between the first and the second frames, and configured to move the first and the second frames relative to each other. The second drive mechanism is provided between the second and the third frames, and configured to move the second and the third frames relative to each other. Each of the first and second drive mechanism has a drive generator configured to generate drive with a piezoelectric element, and a drive receiver pressed relative to the drive generator and receive the drive generated by the drive generator.

14 Claims, 23 Drawing Sheets

U.S. PATENT DOCUMENTS

| | | |
|---|---|---|
| 6,218,767 B1 | 4/2001 | Akada et al. |
| 6,397,008 B2 | 5/2002 | Kuwana et al. |
| 6,798,117 B2 | 9/2004 | Johansson et al. |
| 6,831,393 B2 | 12/2004 | Miyazawa |
| 7,084,550 B2 | 8/2006 | Sasaki et al. |
| 7,222,998 B2 | 5/2007 | Katase |
| 7,545,085 B2 * | 6/2009 | Adachi .................. 310/365 |
| 7,598,656 B2 | 10/2009 | Wischnewskij et al. |
| 8,004,151 B2 * | 8/2011 | Mukae ............... 310/323.02 |
| 8,018,123 B2 * | 9/2011 | Mukae .................... 310/317 |
| 2003/0067544 A1 | 4/2003 | Wada |
| 2005/0259155 A1 | 11/2005 | Okada |
| 2006/0043824 A1 | 3/2006 | Sakano et al. |
| 2006/0056829 A1 | 3/2006 | Hirota et al. |
| 2009/0230818 A1 * | 9/2009 | Mukae et al. ......... 310/323.16 |

FOREIGN PATENT DOCUMENTS

| | | | |
|---|---|---|---|
| JP | H06-6989 A | 1/1994 |
| JP | H07-143770 A | 6/1995 |
| JP | H07-184382 A | 7/1995 |
| JP | H07-255189 A | 10/1995 |
| JP | H09-149664 A | 6/1997 |
| JP | H09-201080 A | 7/1997 |
| JP | H09-285153 A | 10/1997 |
| JP | H10-80166 A | 3/1998 |
| JP | H10-174467 A | 6/1998 |
| JP | H10-327589 A | 12/1998 |
| JP | H11-69851 A | 3/1999 |
| JP | H11-271480 A | 10/1999 |
| JP | 2000-32785 A | 1/2000 |
| JP | 2000-307937 A | 11/2000 |
| JP | 2001-174857 A | 6/2001 |
| JP | 2001-218482 A | 8/2001 |
| JP | 2003-110919 A | 4/2003 |
| JP | 2004-126028 A | 4/2004 |
| JP | 2004-325827 A | 11/2004 |
| JP | 2006-67712 A | 3/2006 |
| JP | 2006-78891 A | 3/2006 |
| JP | 2007-10730 A | 1/2007 |
| JP | 2007-25164 A | 2/2007 |
| WO | 2005/114760 A1 | 12/2005 |

* cited by examiner

DRIVE APPARATUS

CROSS-REFERENCE TO RELATED APPLICATIONS

This U.S. National stage application claims priority under 35 U.S.C. §119(a) to Japanese Patent Applications No. 2006-230248 filed in Japan on Aug. 28, 2006 and No. 2006-241946 filed in Japan on Sep. 6, 2006, the entire contents of which are hereby incorporated herein by reference.

BACKGROUND

1. Technical Field

The technical field to a drive apparatus, and more particularly relates to a drive apparatus equipped with a drive generator for generating drive.

2. Description of the Related Art

Example of conventional vibration actuators for generating vibration are given in Japanese Laid-Open Patent Applications JPH11-271480 and JP2000-32785, in which electrodes are provided at four places on a piezoelectric element, AC voltages of different phase are applied to two pairs of diagonally opposite electrodes, and longitudinal vibration and curved vibration are generated harmonically in the piezoelectric element, which yields a drive force. Also, there are known drive apparatus in which such vibration actuators are used.

In general, a vibrator has to be subjected to suitable pressurization to obtain a drive force. As shown in FIG. 20, in JPH11-271480, two rails 201a are provided to a support base 201, and grooves 202b provided to a first moving body 202 are disposed over the rails 201a. A second moving body 203 in which grooves 203a are formed are disposed over two rails 202a provided to the first moving body 202. A vibration actuator 204 having a protrusion 204a is fixed to the support base 201, and is pressurized with respect to the first moving body 202 by a biasing member 204b fixed to the support base 201. When drive voltage is applied to the vibration actuator 204, the vibration actuator 204 undergoes curved vibration, and the first moving body 202 moves along the rails 201a. Also, a vibration actuator 205 having a protrusion 205a is fixed to the first moving body 202, and is pressurized with respect to the second moving body 203 by a biasing member 205b fixed to the first moving body 202. When drive voltage is applied to the vibration actuator 205, the vibration actuator 205 undergoes curved vibration, and the second moving body 203 moves along the rails 202a.

Meanwhile, as digital cameras have increased in image quality and decreased in size in recent years, a digital camera has been known that comprises a drive apparatus for driving a correction lens (image blur correction apparatus) in order to eliminate image blur from captured images (see Japanese Laid-Open Patent Application JP2004-126028, for example). This image blur correction apparatus will be described through reference to FIG. 21.

An image blur correcting lens group L3 for correcting image blur during image capture is fixed to a pitch movement frame 332 that is capable of moving in the pitch direction, which is a first direction (Y direction), and in the yaw direction, which is a second direction (X direction). This pitch movement frame 332 has a bearing 332a on the X direction negative side, and a rotation stop 332b on the X direction positive side. A pitch shaft 333a that is parallel to the Y direction is inserted in this bearing 332a, and a pitch shaft 333b that is parallel to the Y direction (discussed below) is mated to the rotation stop 332b, which allows the pitch movement frame 332 to slide in the first direction (Y direction).

A yaw movement frame 334 that moves the image blur correcting lens group L3 in the second direction (X direction) is attached to the pitch movement frame 332 on the Z direction negative side. The yaw movement frame 334 is provided with a fixing component 334a that fixes both ends of the pitch shaft 333a to slide the above-mentioned pitch movement frame 332 in the pitch direction (Y direction), and the pitch shaft 333b, which is mated to the rotation stop 332b on the X direction positive side. The yaw movement frame 334 has a bearing 334b on the Y direction positive side, and a fixing component 334c to which a yaw shaft 335b and the two ends thereof are press-fitted and fixed on the Y direction negative side. A yaw shaft 335a that is parallel to the X direction is inserted into this bearing 334b, and the yaw shaft 335b that is parallel to the X direction is mated to a rotation stop 308d of a three-group frame 308, which allows the yaw movement frame 334 to slide in the second direction (X direction).

The three-group frame 308 provided on the Z direction negative side with respect to the yaw movement frame 334 is provided with a fixing component 308c that fixes both ends of the yaw shaft 335a for sliding the above-mentioned yaw movement frame 334 in the yaw direction (X direction), and the rotation stop 308d to which the yaw shaft 335b is mated.

A rectangular electrical substrate 336 is attached to the face of the pitch movement frame 332 on the Z direction negative side. The electrical substrate 336 is provided with a first coil 337y that drives the image blur correcting lens group L3 in the pitch direction and a second coil 337x that drives the image blur correcting lens group L3 in the yaw direction, and a hole element 338y that detects the position of the image blur correcting lens group L3 in the pitch direction and a hole element 338x that detects the position of the image blur correcting lens group L3 in the yaw direction. The coils 337y and 337x are constituted integrally with the electrical substrate 336 as laminated coils.

Magnets 339y and 339x are dipole magnetized on one side. These magnets 339y and 339x are respectively fixed to yokes 340y and 340x that are substantially U-shaped in cross section. The yoke 340y is press-fitted to a mating component 308y of the three-group frame 308 from the Y direction. Similarly, the second yoke 340x is press-fitted to a mating component 308x of the three-group frame 308 from the X direction.

A first electromagnetic actuator 341y is constituted by the first coil 337y, the first magnet 339y, and the first yoke 340y. Similarly, a second electromagnetic actuator 341x is constituted by the second coil 337x, the second magnet 339x, and the second yoke 340x. The first electromagnetic actuator 341y drives the pitch movement frame 332 in the pitch direction (Y direction), which is the first direction, and the second electromagnetic actuator 341x drives the pitch movement frame 332 in the yaw direction (X direction), which is the second direction.

With the constitution described above, when current flows to the first coil 337y of the electrical substrate 336, the first magnet 339y and the first yoke 340y generate electromagnetic force in the pitch direction (Y direction), which is the first direction. Similarly, when current flows to the second coil 337x of the electrical substrate 336, the second magnet 339x and the second yoke 340x generate electromagnetic force in the yaw direction (X direction), which is the second direction. Thus, the image blur correcting lens group L3 is driven by the two electromagnetic actuators 341y and 341x in the Y and X directions, substantially perpendicular to the optical axis of the Z direction.

Next, position detectors 342y and 342x that detect the position of the image blur correcting lens group L3 will be described. The hole elements 338y and 338x, which convert a magnetic flux into an electrical signal, are positioned and fixed to the electrical substrate 336. The magnets 339y and 339x of the electromagnetic actuators 341y and 341x described above also serve as detection magnets. Therefore, the position detectors 342y and 342x are constituted by the hole elements 338y and 338x and the magnets 339y and 339x. Here, the state of the magnetic flux of the magnets 339y and 339x will be described through reference to FIG. 22. The horizontal axis in the graph shows the position in the pitch direction (Y direction) or yaw direction (X direction) around the optical axis, and the vertical axis shows the magnetic flux density. The middle of the horizontal axis is the boundary portion of dipole magnetization of the magnets 339y and 339x, at which point the magnetic flux density is zero. This position substantially coincides with the optical axis center of the image blur correcting lens group L3. When the hole elements 338y and 338x are moved with respect to the magnets 339y and 339x, within the range indicated by the dotted lines, the center of which is the position at which the displacement is zero, the magnetic flux density varies substantially linearly with respect to changes in the amount of displacement. Therefore, it is possible to detect the position of the image blur correcting lens group L3 in the pitch direction (Y direction) or the yaw direction (X direction) by detecting the electrical signal outputted from the hole elements 338y and 338x.

A flexible printed cable 343 is attached to the electrical substrate 336 and transmits signals between the coils 337x and 337y, the hole elements 338y and 338x, and the circuit of a camera main body (not shown).

An image blur correction apparatus 331 is constituted by the above-mentioned constituent elements 332 to 343.

Also, as shown in FIG. 23A, with the constitution disclosed in JP2000-32785, a pressurizing mechanism comprises a biasing member 403 that generates a biasing force, and a transmission member 402 that rotates around a rotational shaft 404 and transmits the biasing force generated by the biasing member 403 to a vibration actuator 401. The transmission member 402 converts the direction A of the biasing force generated by the biasing member 403 into a direction P.

Also, as shown in FIG. 23B, with the constitution disclosed in Japanese Laid-Open Patent Application JPH9-285153, a support member 508, consisting of a flat spring 507 to which a tapered pin 506 is attached, is disposed opposite a vibration actuator 501 equipped with an elastic body 502 and piezoelectric bodies 503 and 504. A relative motion member 509 comes into contact under pressure with the vibration actuator 501 and performs relative motion with the vibration actuator 501. The support member 508 is fixed to a fixing member 505 and the vibration actuator 501, the position of the vibration actuator 501 is restricted to the direction of relative motion, and at the same time, the vibration actuator 501 is supported displaceably in a direction substantially parallel to the direction of pressurization of the relative motion member 509.

SUMMARY

There is a need for further reduction in the size of the drive apparatus described above.

More specifically, the drive apparatus shown in FIG. 20 tends to be bulkier because the vibration actuators 204 and 205 and the biasing members 204b and 205b are fixed on the support base 201 and the first moving body 202. Also, since the biasing members 204b and 205b are used to apply pressure to the first moving body 202 and the second moving body 203, the rails 201a and 202a and the grooves 202b and 203a tend to be subjected to frictional load, and because of the need to raise stiffness, the apparatus ends up being bulkier in its overall thickness direction or in a direction perpendicular to the thickness direction.

Also, with the drive apparatus shown in FIG. 21, the number of windings of the coils 337x and 337y has to be increased, or the magnets 339y and 339x have to be made larger, in order to raise the electromagnetic force. Also, the hole elements 338y and 338x are used for position detection sensors, so a problem is that the magnets end up being bulkier because of the need to ensure linearity in the magnetic flux density with respect to position. As a result, the overall drive apparatus ends up being bulkier in the thickness direction or a direction perpendicular to the thickness direction.

With the technique shown in FIG. 23A, the biasing member 403 that generates a bias force is constituted by a spring, and furthermore the transmission member 402 is provided for converting the direction of the biasing force. Consequently, the mechanism configured to generate biasing force ends up being larger. Also, if the biasing force produced by the biasing member 403 is increased in order to generate a larger drive force, the members on which the vibration actuator 401 acts will bend, and the proper drive efficiency will be difficult to obtain.

With the technique shown in FIG. 23B, biasing force is generated by the flat spring 507 disposed opposite the vibration actuator 501, so the flat spring 507 needs to be quite stiff in order to generate a large drive force. However, if the stiffness of the flat spring 507 is increased, the flat spring will not be able to absorb looseness in the direction perpendicular to the sliding direction, and drive efficiency decreases.

It is an object to provide a drive apparatus that is smaller in size in the thickness direction or a direction perpendicular to the thickness direction.

It is another object to provide a drive apparatus with which good drive efficiency is achieved.

A drive apparatus according to a first aspect includes a first frame, a second frame, a third frame, a first drive mechanism, and a second drive mechanism. The second frame is supported movably in a first direction with respect to the first frame. The third frame is supported movably in a second direction that intersects the first direction with respect to the second frame. The first drive mechanism is provided between the first frame and the second frame, and configured to move the first frame and the second frame relative to each other. The second drive mechanism is provided between the second frame and the third frame, and configured to move the second frame and the third frame relative to each other. Each of the first drive mechanism and the second drive mechanism has a drive generator configured to generate drive with a piezoelectric element, and a drive receiver that is pressed relative to the drive generator and receives the drive generated by the drive generator. The direction in which the drive generator acts on the drive receiver in the first drive mechanism is parallel and opposite to the direction in which the drive generator acts on the drive receiver in the second drive mechanism.

A drive apparatus according to a second aspect includes a first frame, a second frame, a third frame, a first drive mechanism, and a second drive mechanism. The second frame is supported movably in a first direction with respect to the first frame. The third frame is supported movably in a second direction that intersects the first direction with respect to the second frame. The first drive mechanism is provided between the first frame and the second frame, and configured to move the first frame and the second frame relative to each other. The second drive mechanism is provided between the second frame and the third frame, and configured to move the second frame and the third frame relative to each other. Each of the first drive mechanism and the second drive mechanism has a drive generator configured to generate drive with a piezoelectric element, and a drive receiver that is pressed relative to the drive generator and receives the drive generated by the drive generator. The drive generator and the drive receiver included in each of the first drive mechanism and the second drive mechanism are disposed in the same plane parallel to the first direction and the second direction, and the direction in which the drive generator acts on the drive receiver in the first drive mechanism intersects in the same plane with the direction in which the drive generator acts on the drive receiver in the second drive mechanism.

A drive apparatus according to a third aspect is the apparatus of the first or second aspect, wherein the drive generator generates a standing wave in the piezoelectric element by combining longitudinal vibration with curved vibration, and thereby relatively drives the drive receiver.

A drive apparatus according to a fourth aspect is the apparatus of any one of the first to third aspects, wherein a first main shaft extending in the first direction is provided to the first frame. The second frame is provided with a first auxiliary shaft that extends in the first direction and is disposed on the second direction opposite side from the side on which the first main shaft is provided, a second main shaft that extends in the second direction, and a second auxiliary shaft that extends in the second direction and is disposed on the first direction opposite side from the side on which the second main shaft is provided. The first main shaft constitutes the drive receiver of the first drive mechanism. The second main shaft constitutes the drive receiver of the second drive mechanism.

A drive apparatus according to a fifth aspect is the apparatus of any one of the first to fourth aspects, wherein an optical component is disposed on the third frame.

A drive apparatus according to a sixth aspect includes a drive generator, a relative drive component, a restrictor, and a biaser. The drive generator generates drive with a piezoelectric element. The relative drive component receives the drive generated by the drive generator and is driven relative to the drive generator. The restrictor is disposed opposite the drive generator with the relative drive component interposed therebetween, and restricts displacement of the relative drive component to the opposite side from the drive generator side where the drive generator acts. The biaser biases the drive generator and the restrictor in the direction of moving closer together.

With this drive apparatus, because the restrictor is disposed at a location opposite the drive generator with the relative drive component interposed therebetween, when the drive generator acts on the relative drive component, even if the drive force should be high enough to deform the relative drive component, deformation of the relative drive component will be restricted by the restrictor. In particular, since the driver and the restrictor are biased closer together by the biaser, deformation of the relative drive component is more effectively restricted. Thus, a decrease in drive efficiency that would be caused by deformation of the relative drive component can be prevented, which affords better drive efficiency.

A drive apparatus according to a seventh aspect is the apparatus of the sixth aspect, wherein the restrictor has a rolling element, a supporter, and a guide. The rolling element comes into rolling contact with the relative drive component. The supporter substantially supports the position of the rolling element. The guide is formed so as to cover the rolling element and the supporter from the opposite side from the relative drive component side, and guides the rolling element and the supporter.

Here, the term "rolling element" refers, for example, to a spherical member (ball), cylindrical member (roller), or the like.

With this drive apparatus, because the restrictor comes into rolling contact with the relative drive component via the rolling element, a decrease in drive efficiency that would be caused by the restrictor hitting the relative drive component can be prevented, which affords better drive efficiency.

A drive apparatus according to an eighth aspect is the apparatus of the seventh aspect, wherein the guide is formed such that its cross section perpendicular to the relative drive direction of the drive generator and the relative drive component is substantially U-shaped. The rolling element is disposed at two corners of the U shape, and is supported on two opposite sides of the U shape.

With this drive apparatus, because the rolling element is restricted in its movement by the guide, it can come into proper contact with the relative drive component. Thus, a decrease in drive efficiency that would be caused by the restrictor hitting the relative drive component can be prevented, which affords better drive efficiency.

The drive apparatus according to a ninth aspect is the apparatus of the seventh or eighth aspect, further including a main body that supports the drive generator and is driven relatively with the relative drive component. A restrictor that restricts rotation of the guide around the relative drive component is provided to the guide.

With this drive apparatus, because rotation of the guide around the relative drive component is restricted, the restrictor guided by the guide comes into proper contact with the relative drive component. Also, the guide is easier to attach.

The drive apparatus according to a tenth aspect is the apparatus of any of the seventh to ninth aspects, wherein a sliding protrusion that slides with an opposing member is formed on at least one of the guide side and the relative drive component side of the supporter.

With this drive apparatus, a sliding protrusion is formed, and the sliding surface area between opposing members can be reduced. Thus, a decrease in drive efficiency can be prevented, which affords better drive efficiency.

The drive apparatus according to an eleventh aspect is the apparatus of the tenth aspect, wherein the sliding protrusion on the relative drive component side of the supporter extends in a direction that intersects the direction in which the relative drive component is relatively driven.

The drive apparatus according to a twelfth aspect is the apparatus of the tenth or eleventh aspect, wherein the sliding protrusion on the guide side of the supporter extends in the direction in which the relative drive component is relatively driven.

The drive apparatus according to a thirteenth aspect is the apparatus of any of the seventh to twelfth aspects, wherein a ceramic material is disposed at the place where the drive generator acts on the relative drive component.

With this drive apparatus, wherein a ceramic material is disposed at the place where the drive generator acts on the relative drive component, so a decrease in drive efficiency that would be caused by wear of the members can be prevented.

The drive apparatus according to a fourteenth aspect is the apparatus of any of the seventh to thirteenth aspects, further including a movement restrictor that restricts movement of the drive generator in a direction perpendicular to the direction in which the drive generator acts on the relative drive component.

With this drive apparatus, because a movement restrictor is included, the drive generator comes into better contact with the relative drive component. Thus, better drive efficiency can be achieved.

DETAILED DESCRIPTION OF THE PREFERRED EMBODIMENTS

Embodiments will now be described through reference to the drawings.

First Embodiment

The drive apparatus in a first embodiment will be described.

Figure 1:
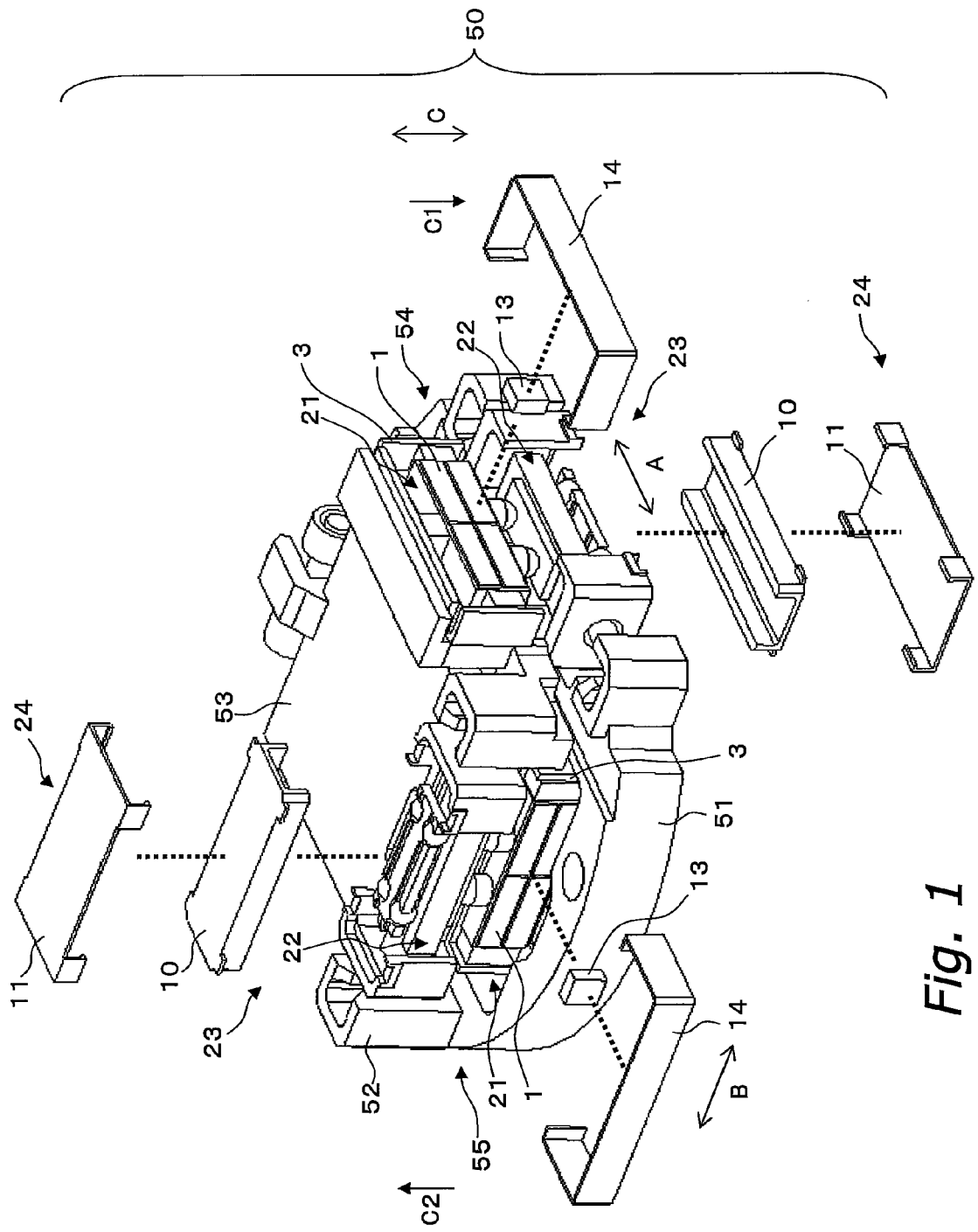
FIG. 1 is an exploded oblique view of the constitution of a drive apparatus (first embodiment)
Figure 2:
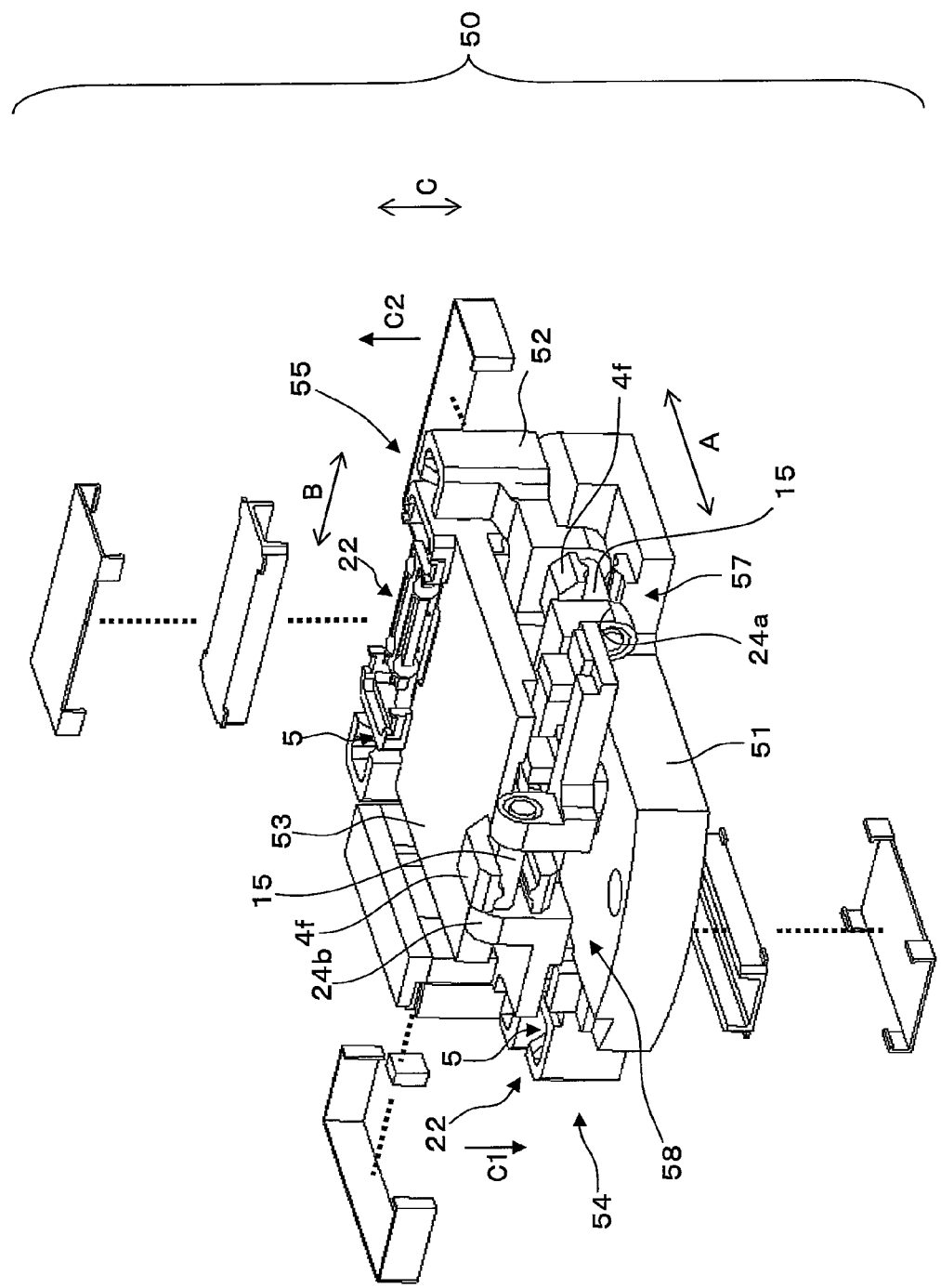
FIG. 2 is an exploded oblique view of the constitution on the back side of a drive apparatus (first embodiment)

FIG. 1 is an exploded oblique view of a drive apparatus 50, and FIG. 2 is an exploded oblique view of the back side of the drive apparatus 50.

Drive Apparatus 50

The drive apparatus 50 is installed in a digital still camera, a digital video camera, or another such optical device, and is used to drive an optical component such as a lens or a CCD, a CMOS, or another such imaging element in two directions perpendicular to the optical axis, to correct blurring of an optical image. The drive apparatus 50 shown in FIG. 1 in particular is an apparatus that has an imaging element, etc., mounted on its upper face side, and drives this element.

As shown in FIG. 1, the drive apparatus 50 comprises a first frame 51, a second frame 52, a third frame 53, a first drive mechanism 54, and a second drive mechanism 55. The second frame 52 is supported movably in a first direction A with respect to the first frame 51. The third frame 53 is supported movably in a second direction B that is perpendicular to the first direction A with respect to the second frame 52.

The first drive mechanism 54 is provided between the first frame 51 and the second frame 52, and moves the first frame 51 and the second frame 52 relatively. More specifically, the first drive mechanism 54 drives the second frame 52 in the first direction A with respect to the first frame 51 and the optical device (not shown) to which the first frame 51 is fixed.

The second drive mechanism 55 is provided between the second frame 52 and the third frame 53, and moves the second frame 52 and the third frame 53 relatively. More specifically, the second drive mechanism 55 drives the third frame 53 in the second direction B with respect to the second frame 52. The second drive mechanism 55 is disposed at a location that is rotated 90 degrees around the third direction C that is perpendicular to the first direction A and the second direction B with respect to the first drive mechanism 54.

The first drive mechanism 54 and the second drive mechanism 55 each include a drive generator 21, a drive receiver 22, a bearing 23, and a biaser 24. The drive generator 21 generates drive with a piezoelectric element 1a. The drive receiver 22 is pressed relative to the drive generator 21 and receives the drive generated by the drive generator 21. The bearing 23 is disposed opposite the drive generator 21 with the relative drive component 22 interposed therebetween, and restricts displacement of the drive receiver 22 to the opposite side from the drive generator 21 side where the drive generator 21 acts on the drive receiver 22. The biaser 24 biases the drive generator 21 and the bearing 23 in the direction of moving closer together.

The drive receiver 22 of the first drive mechanism 54 is fixed to the first frame 51, and the biaser 24 and the bearing 23 supporting the drive receiver 22 are provided to the first frame 51. The drive generator 21 of the first drive mechanism 54 is elastically fixed to the second frame 52, and the drive receiver 22 of the second drive mechanism 55, the bearing 23 supporting the drive receiver 22, and the biaser 24 are provided to the second frame 52. The drive generator 21 of the second drive mechanism 55 is elastically fixed to the third frame 53.

As mentioned above, the first drive mechanism 54 and the second drive mechanism 55 are disposed on the first frame 51 to the third frame 53, and the action direction C1 in which the drive generator 21 acts on the drive receiver 22 in the first drive mechanism 54 is parallel and opposite to the action direction C2 in which the drive generator 21 acts on the drive receiver 22 in the second drive mechanism 55. Specifically, the positional relationship between the drive generator 21 and the drive receiver 22 of the first drive mechanism 54 is the reverse of the positional relationship between the drive generator 21 and the drive receiver 22 of the second drive mechanism 55. That is, with the first drive mechanism 54, the drive generator 21 and the drive receiver 22 are disposed opposite each other in the third direction C, and the drive generator 21 is disposed above the drive receiver 22 in the third direction C. On the other hand, with the second drive mechanism 55, the drive generator 21 and the drive receiver 22 are disposed opposite each other in the third direction C, and the drive generator 21 is disposed below the drive receiver 22 in the third direction C.

The effect of thus having the direction in which the drive generator 21 acts on the drive receiver 22 in the first drive mechanism 54 and the second drive mechanism 55 be the third direction C is that the drive apparatus 50 can be smaller in size (projected surface area) as seen in the third direction C. Furthermore, the effect of having the action direction C1 in the first drive mechanism 54 and the action direction C2 in the second drive mechanism 55 be reversed in the third direction C is that the thickness of the drive apparatus 50 can be reduced in the third direction C.

Anti-Rotation Mechanism

As shown in FIG. 2, the two ends of a shaft 5 (discussed below) of the drive receiver 22 of the first drive mechanism 54 are fixed to the first frame 51 in the first direction A. Also, the two ends of a shaft 5 (discussed below) of the drive receiver 22 of the second drive mechanism 55 are fixed to the second frame 52 in the second direction B.

A first anti-rotation mechanism 57 is provided between the first frame 51 and the second frame 52, on the opposite side in the second direction B from the location where the first drive mechanism 54 is provided. The first anti-rotation mechanism 57 serves to prevent the relative rotation of the first frame 51 and the second frame 52 around the shaft 5 of the first drive mechanism 54. The first anti-rotation mechanism 57 is constituted by a rotation stop 4f that is substantially U-shaped and is formed on the first frame 51, and a shaft 15 that is fixed by press-fitting or adhesive bonding to a shaft support 24a of the second frame 52 and is mated to the rotation stop 4f. The shaft 15 of the first anti-rotation mechanism 57 extends in the first direction A.

A second anti-rotation mechanism 58 is provided between the second frame 52 and the third frame 53, on the opposite side in the first direction A from the location where the second drive mechanism 55 is provided. The second anti-rotation mechanism 58 serves to prevent the relative rotation of the second frame 52 and the third frame 53 around the shaft 5 of the second drive mechanism 55. The second anti-rotation mechanism 58 is constituted by a rotation stop 4f that is substantially U-shaped and is formed on the third frame 53, and a shaft 15 that is fixed by press-fitting or adhesive bonding to a shaft support 24b of the second frame 52 and is mated to the rotation stop 4f. The shaft 15 of the second anti-rotation mechanism 58 extends in the second direction B.

As discussed above, the drive generator 21 of the first drive mechanism 54 that drives the second frame 52 in the first direction A acts on the shaft 5 of the first drive mechanism 54, which is one of the two shafts 5 and 15 provided in the first direction A in the drive apparatus 50. Specifically, the drive from the drive generator 21 acts on the drive receiver 22 of the first drive mechanism 54, which is the main shaft for more accurately restricting the motion of the second frame 52 in the first direction A. Therefore, the generation of moment can be suppressed, and the second frame 52 can be driven more accurately (linearly) in the first direction A.

Also, the drive generator 21 of the second drive mechanism 55 that drives the third frame 53 in the second direction B acts on the shaft 5 of the second drive mechanism 55, which is one of the two shafts 5 and 15 provided in the second direction B in the drive apparatus 50. Specifically, the drive from the drive generator 21 acts on the drive receiver 22 of the second drive mechanism 55, which is the main shaft for more accurately restricting the motion of the third frame 53 in the second direction B. Therefore, the generation of moment can be suppressed, and the third frame 53 can be driven more accurately (linearly) in the second direction B.

Drive Mechanism

The first drive mechanism 54 and the second drive mechanism 55 will now be described through reference to the drawings. Since the drive generators 21, the drive receivers 22, the bearings 23, and the biasers 24 that constitute these drive mechanisms have substantially the same constitution, only the second drive mechanism 55 will be described in detail below, and the description of the first drive mechanism 54 will be omitted.

Figure 3:
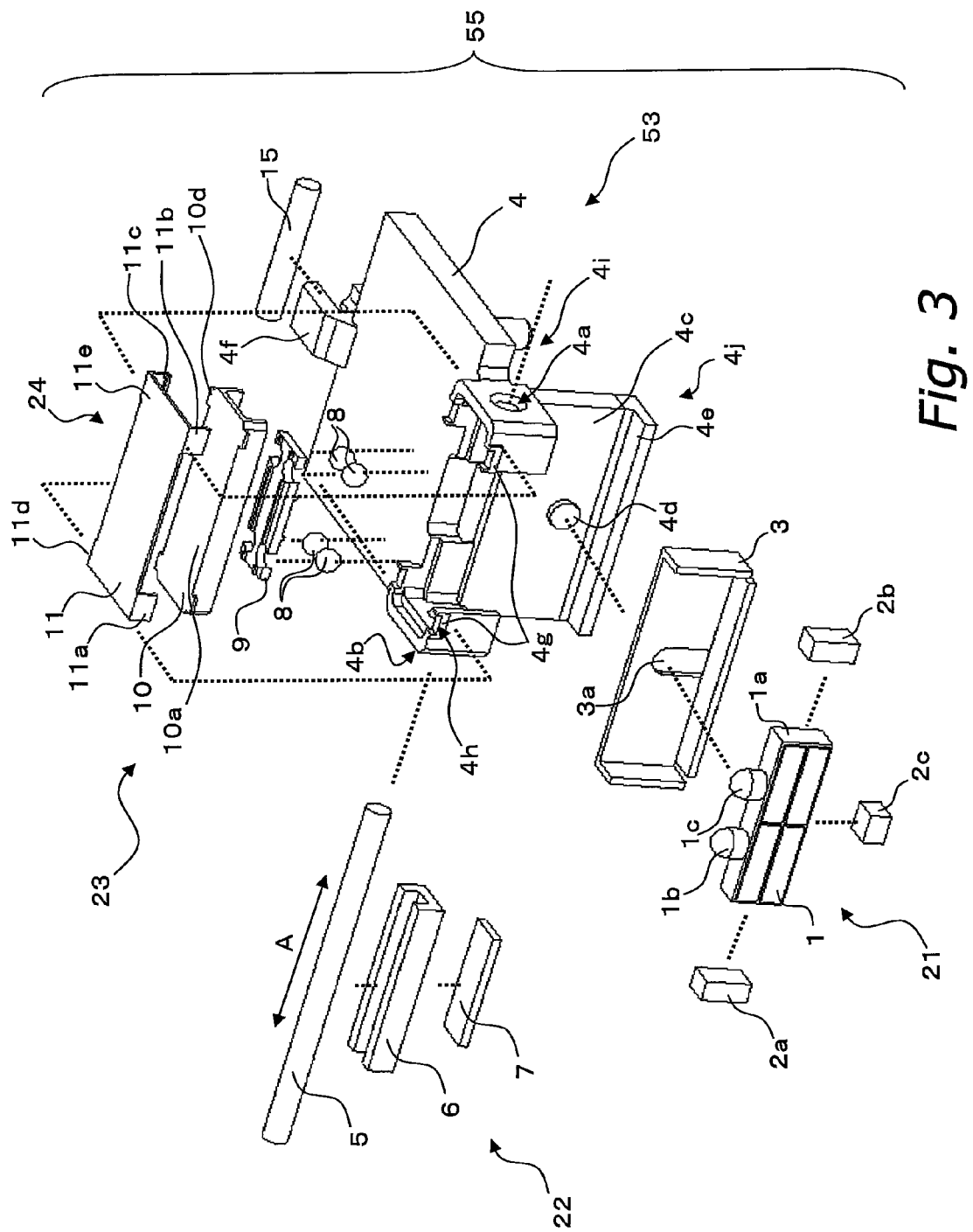
FIG. 3 is an exploded oblique view of the constitution of a second drive mechanism (first embodiment)

FIG. 3 is an exploded oblique view of the second drive mechanism 55.

As mentioned above, the second drive mechanism 55 includes the drive generator 21, the drive receiver 22, the bearing 23, and the biaser 24.

The drive generator 21 generates drive with a piezoelectric element or another such electro-mechanical conversion element, for example. The drive receiver 22 receives the drive generated by the drive generator 21, and is driven relative to the drive generator 21. The bearing 23 is disposed opposite the drive generator 21 with the relative drive component 22 interposed therebetween, and restricts displacement of the drive receiver 22 to the opposite side from the drive generator 21 side where the drive generator 21 acts on the drive receiver 22. The biaser 24 biases the drive generator 21 and the bearing 23 in the direction of moving closer together.

This drive generator 21 is supported by the third frame 53, and the third frame 53 is driven relative to the drive receiver 22 by the drive generated by the drive generator 21.

The various constitutions discussed above will now be described in further detail.

Drive Generator 21

Figure 4:
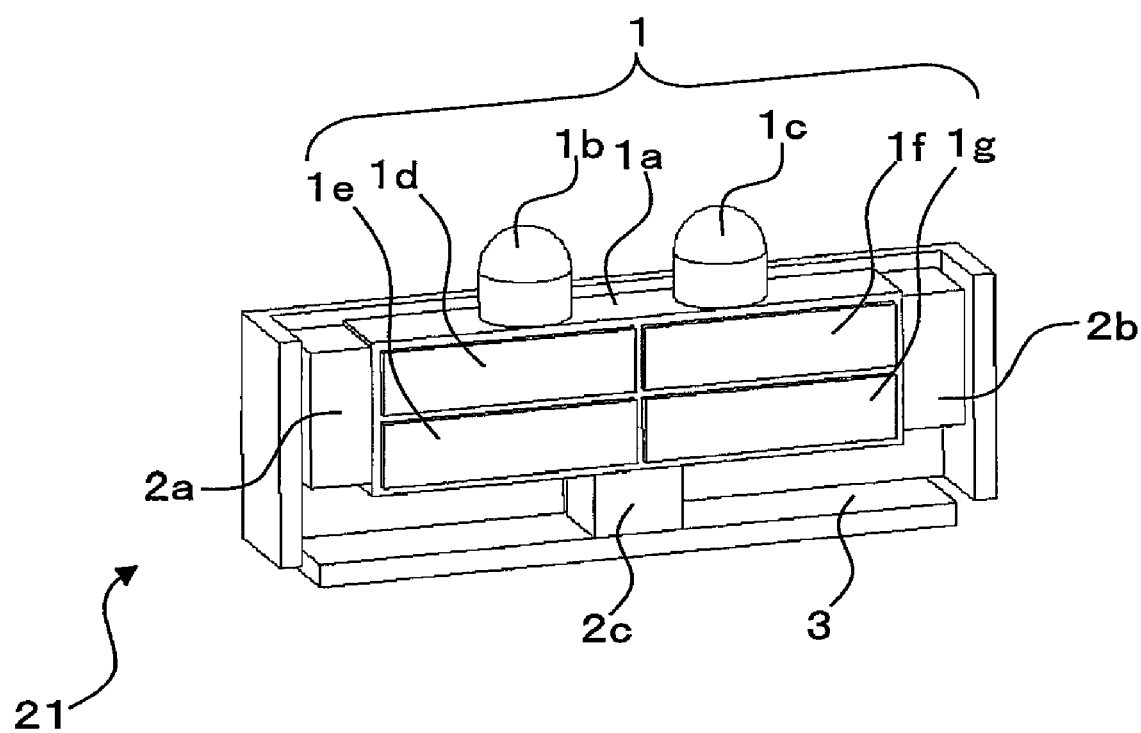
FIG. 4 is an oblique view of the constitution of a drive generator (first embodiment)

FIG. 4 is an oblique view of the drive generator 21 with which the second drive mechanism 55 is equipped.

The drive generator 21 is constituted mainly by a vibration actuator 1, elastic bodies 2a to 2c, and an actuator case 3.

The vibration actuator 1 is constituted mainly by a piezoelectric element 1a that is cuboid in shape, two drivers 1b and 1c that are disposed on the side face of the long side of the face of the piezoelectric element 1a having the largest surface area (hereinafter referred to as the main face) and that come into frictional contact with the drive receiver 22, and four electrodes 1d to 1g formed on the main face.

The piezoelectric element 1a is a member made primarily of a ceramic or the like. The piezoelectric element 1a generates drive force when AC voltages of different phase are applied to two pairs of diagonally opposite electrodes 1d and 1g, and 1e and 1f, which results in longitudinal vibration and curved vibration being generated harmonically. The application of voltage is performed using a flexible printed board (not shown) connected to the electrodes 1d to 1g. The drivers 1b and 1c are made of a ceramic material, for example, whose heads that come into contact with the drive receiver 22 are formed in a hemispherical shape. The drivers 1b and 1c are fixed to the piezoelectric element 1a, and transmit the drive force generated by the piezoelectric element 1a to the drive receiver 22. The shape of the heads of the drivers 1b and 1c is not limited to the hemispherical shape shown in the drawing, and may be formed in another curved surface shape, and any shape is acceptable as long as it raises drive efficiency.

The elastic bodies 2a and 2b elastically support the side faces on the short sides of the main face of the piezoelectric element 1a from both sides. The elastic body 2c elastically supports a side face on the long side of the main face of the piezoelectric element 1a on the drive receiver 22 side. The elastic bodies 2a to 2c are made of rubber, felt, or the like, and generate a biasing force by undergoing elastic deformation. The elastic bodies 2a to 2c maintain the orientation of the vibration actuator 1 with respect to the drive receiver 22, and serve to raise drive efficiency when the vibration actuator 1 drives the drive receiver 22. The elastic body 2c, along with a pressurizing spring 11 (discussed below), constitutes the biaser 24, which biases the drive generator 21 and the bearing 23 in the direction of moving closer together (see FIG. 3).

The actuator case 3 integrally supports the elastic bodies 2a to 2c and the vibration actuator 1. More specifically, the vibration actuator 1 is fixed via the elastic bodies 2a to 2c to the inside of the actuator case 3. A through-hole 3a that passes through the actuator case 3 in its thickness direction is formed on the face that is opposite the face of the piezoelectric element 1a on the opposite side from its main face (see FIG. 3). The actuator case 3 is disposed opposite a flat face 4c by mating the through-hole 3a with a protrusion 4d formed on the flat face 4c of the third frame 53 (discussed below). As a result, the elastic bodies 2a to 2c and the vibration actuator 1 fixed inside the actuator case 3 are positioned with respect to the third frame 53 and the members disposed on the third frame 53. More specifically, they are disposed so that the drivers 1b and 1c of the vibration actuator 1 will be in contact with the shaft 5, a substantially U-shaped base 6, and a ceramic plate 7 of the drive receiver 22 (discussed below). At this point, since the elastic body 2c contracts somewhat, the drivers 1b and 1c of the vibration actuator 1 press on the ceramic plate 7 while in contact therewith. The through-hole 3a need not be formed in the actuator case 3, and the actuator case 3 may be bonded and fixed to a flat face 4c to which no protrusion 4d is provided.

Drive Receiver 22

The drive receiver 22 (see FIG. 3) is mainly constituted by a stainless steel shaft 5, a base 6 that is fixed to the shaft 5, and a ceramic plate 7 that is affixed to the face of the base 6 that is opposite the drive generator 21. The shaft 5 is inserted into insertion holes 4a and 4b in the third frame 53 (discussed below), and is driven relative to the axial direction of the shaft 5 (the direction indicated by A) with respect to the third frame 53. The base 6 is bonded and fixed by an adhesive at the center position of the shaft 5 that has been inserted into the insertion holes 4a and 4b, between the insertion holes 4a and 4b, or is fixed by chemical joining of different kinds of material.

The heads of the drivers 1b and 1c are formed in a hemispherical shape. Therefore, to drive the drive receiver 22 more efficiently, it is preferable for the drivers 1b and 1c to come into direct contact with the flat ceramic plate 7 fixed to the shaft 5, rather than the drivers 1b and 1c coming into direct contact with the cylindrical shaft 5. Assembly will be easier if the drivers 1b and 1c and the drive receiver 22 come into contact via the flat ceramic plate 7.

If the drivers 1b and 1c have a shape that curves in the sliding direction (the axial direction of the shaft 5), drive efficiency will not suffer that much even if the drivers 1b and 1c come into contact with the arced portion of the cylindrical shaft 5. However, the drive generator 21 generates high-frequency drive, and the transmission of drive from the drive generator 21 to the drive receiver 22 is by friction, so if the drivers 1b and 1c, which are formed from a ceramic material, come into direct contact with the shaft 5, which is formed from a metal material, there will be considerable wear of the contact parts. If the drive apparatus 50 is installed in an apparatus that permits such things as a decrease in drive efficiency or dust produced by wear of the shaft 5, then it is also possible to adopt a configuration such as bringing the drivers 1b and 1c into direct contact with the cylindrical shaft 5, or making a D-cut in the shaft 5 and bringing the flat part thereof into direct contact with the drivers 1b and 1c.

However, if the drive apparatus 50 is installed in an apparatus that does not permit such things as a decrease in drive efficiency or dust produced by wear of the shaft 5, then the contact parts will have to be made of a material that is resistant to wear. On the other hand, if the shaft 5 is made of a ceramic material, it will be difficult to polish the ceramic material, which is very hard, into a cylindrical shape with good accuracy, and this drives up the cost. Consequently, with the second drive mechanism 55, a configuration is employed in which the shaft 5 is made of a metal material that poses no problems with cost or the like and can be easily and accurately polished, while the ceramic plate 7 is fixed to this shaft 5. When the base 6 is made of a ceramic material, the ceramic plate 7 need not be provided. The base 6 does not have to be formed exactly into a U shape, and may have a cross section that is arc-shaped (C-shaped) to match the shaft 5.

Bearing 23

The bearing 23 (see FIG. 3) is a member that is disposed opposite the drive generator 21 with the shaft 5 interposed therebetween, and restricts bending of the shaft 5 caused by drive of the drive generator 21. The bearing 23 includes four spherical rolling bodies 8 that come into contact with the shaft 5 and serve to decrease sliding resistance of the bearing 23 with respect to the shaft 5, a rolling element supporter 9 that supports the rolling bodies 8, and a guide rail 10 that guides the rolling bodies 8 and the rolling element supporter 9.

Figure 5:
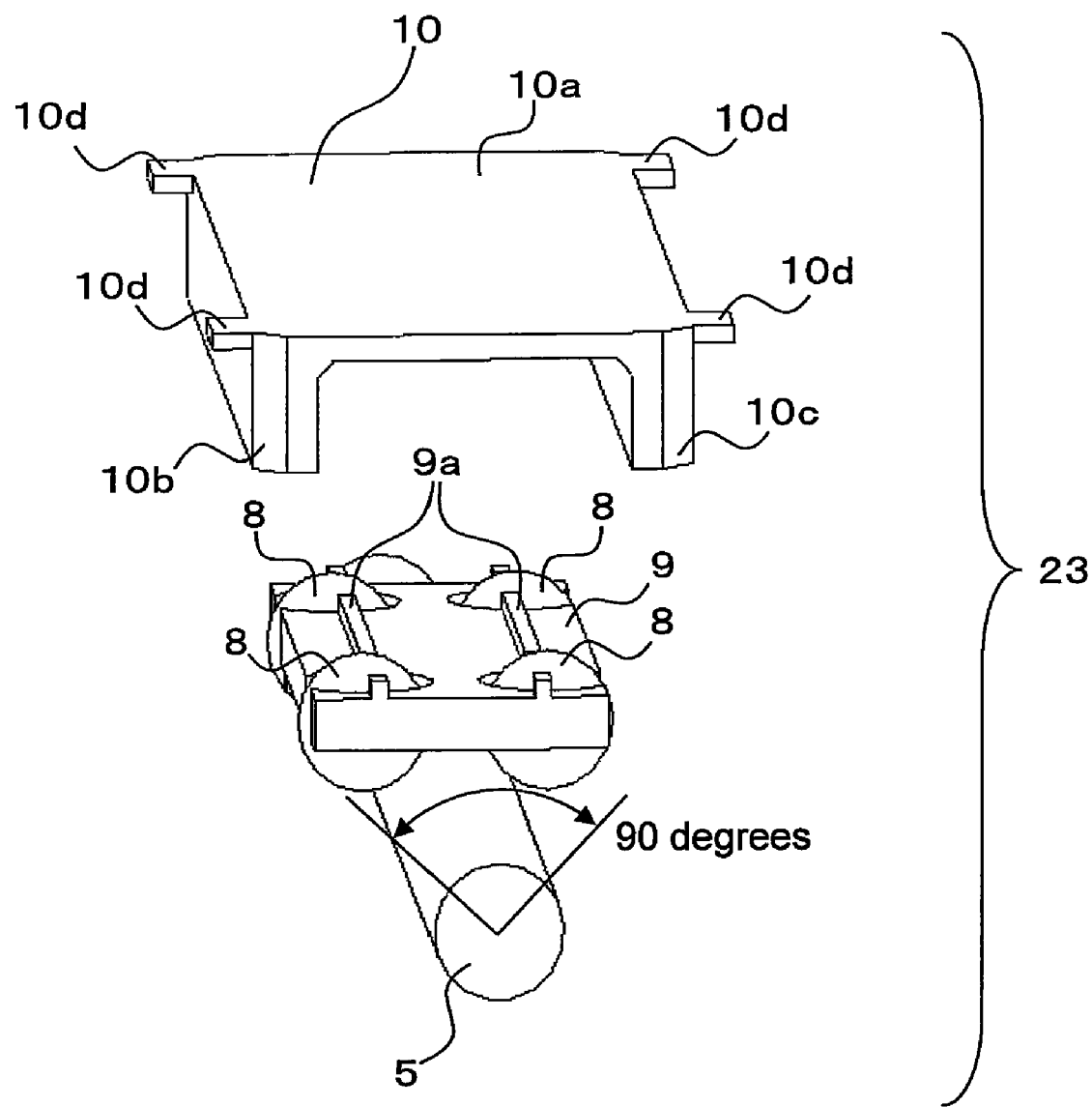
FIG. 5 is an exploded oblique view of the constitution of a bearing (first embodiment)
Figure 6:
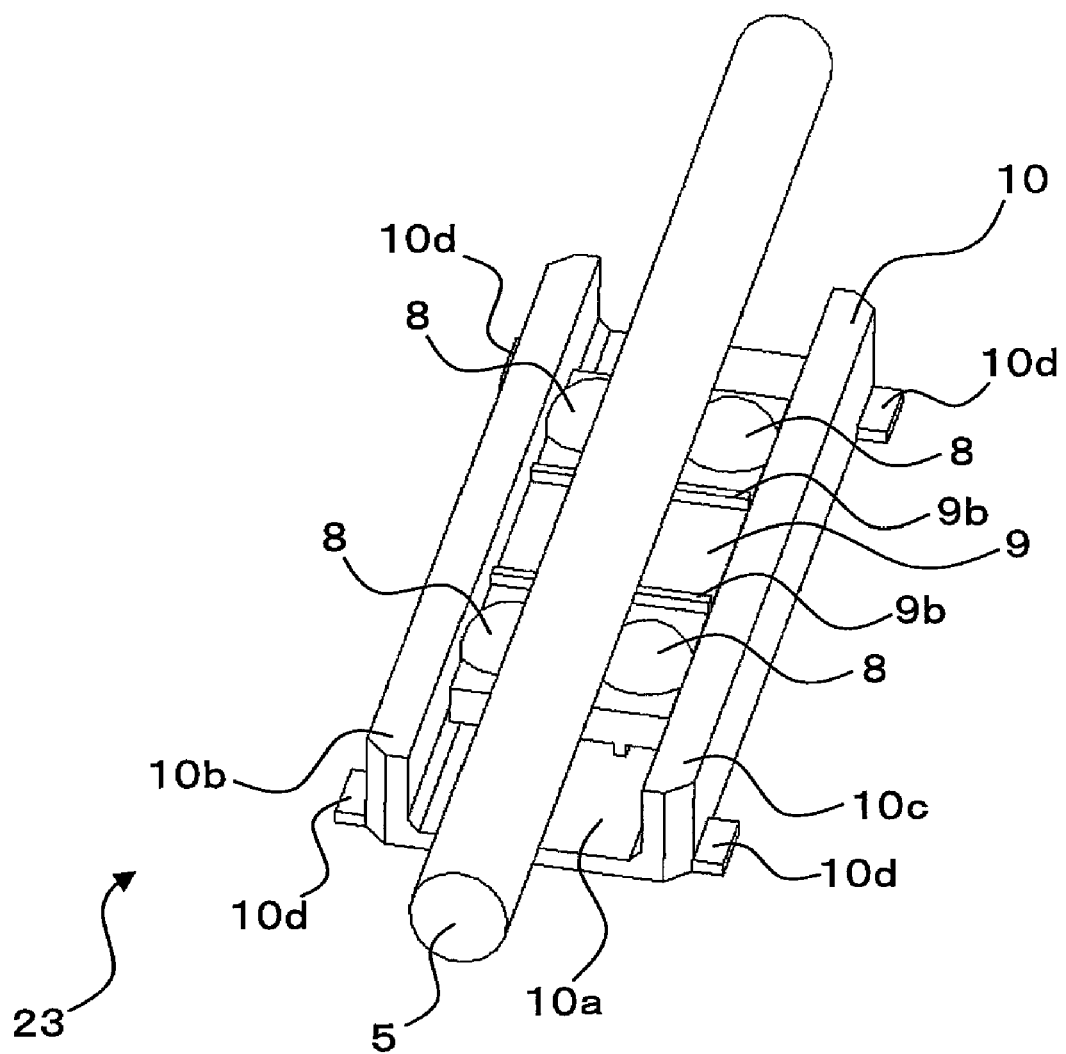
FIG. 6 is an exploded oblique view of the constitution of a bearing (first embodiment)

The configuration of the bearing 23 will be described in detail through reference to FIGS. 5 and 6. FIG. 5 is a detail view of the bearing 23, and shows a state in which the guide rail 10 has been removed from the bearing 23. FIG. 6 is an oblique view of the bearing 23 as seen from below (the drive generator 21 side).

The rolling bodies 8 consist of steel balls, and four of them are disposed in the bearing 23. When safety of the bearing 23 is considered, it is sufficient for four of the rolling bodies 8 to be disposed, but more may be used instead. Furthermore, the rolling bodies 8 need not consist of steel balls, and as long as they are safe and reduce the sliding load, they may be made from any other material.

The rolling element supporter 9 is a substantially cuboid member, and is made from a resin with good sliding properties, such as polyacetal (POM) or polyphenylene sulfide (PPS). The rolling element supporter 9 has circular openings for supporting the rolling bodies 8 at its four corners. The openings pass through the rolling element supporter 9 in its thickness direction, and open out on the side faces of the long sides of the rolling element supporter 9. The rolling bodies 8 are disposed on the inside of the openings, and their movement is restricted in a direction perpendicular to the thickness direction of the rolling element supporter 9. Also, a part of each of the rolling bodies 8 protrudes from the side faces of the long sides of the rolling element supporter 9.

The rolling element supporter 9 is disposed opposite the shaft 5 in a state in which the rolling bodies 8 have been supported in their through-holes. At this point, the rolling element supporter 9 supports the rolling bodies 8 so that the rolling bodies 8 aligned in the short-side direction are disposed at an aperture angle of approximately 90° with respect to the axis of the shaft 5.

The guide rail 10 is a substantially U-shaped member disposed so as to cover the rolling element supporter 9, which is in a state of supporting the rolling bodies 8, from the opposite side from the shaft 5. The guide rail 10 has a top face 10a and two side faces 10b and 10c extending substantially perpendicular to the top face 10a from two opposite sides of the top face 10a.

The rolling bodies 8 supported by the rolling element supporter 9 are in contact with and roll on the top face 10a and the side face 10b, or the top face 10a and the side face 10c, of the guide rail 10. Therefore, repulsion from the shaft 5 is uniformly transmitted through the rolling bodies 8 to the top face 10a and the side faces 10b and 10c, and the sliding load is markedly reduced.

Protrusions 9a and 9b are formed on the faces of the rolling element supporter 9 on the shaft 5 side and the guide rail 10 side in order to reduce sliding resistance with the shaft 5 and the guide rail 10. The protrusion 9a (see FIG. 5) extends from the face of the rolling element supporter 9 on the guide rail 10 side, in the axial direction of the shaft 5. Also, a plurality (two, for example) of the protrusions 9a are formed lined up perpendicular to the axial direction of the shaft 5. A protrusion 9b (see FIG. 6) is formed on the face of the rolling element supporter 9 on the shaft 5 side. More specifically, the protrusion 9b extends perpendicular to the axial direction of the shaft 5 from a central position between the openings lined up in the axial direction of the shaft 5. Also, a plurality (two, for example) of the protrusions 9b are formed lined up in the axial direction of the shaft 5.

The protrusions 9a are formed parallel to the sliding direction when the rolling element supporter 9 and the guide rail 10 slide, so there is less contact surface area, and sliding resistance can be reduced. Also, since the protrusions 9b are formed perpendicular to the sliding direction when the rolling element supporter 9 and the shaft 5 slide, there is less contact surface area, and sliding resistance can be reduced. This improves the overall sliding characteristics of the bearing 23.

As shown in FIG. 5, four protrusions 10d extending from the side faces 10b and 10c are formed at the four corners of the top face 10a of the guide rail 10. As shown in FIG. 3, the protrusions 10d are fitted into supports 4h of the third frame 53 (discussed below), which maintains the orientation of the guide rail 10. More specifically, with the guide rail 10, the protrusions 10d formed at the four corners are supported by the supports 4h, so rotation around the shaft 5 is restricted. This also makes it possible to restrict rotation around the shaft 5 of the rolling element supporter 9 and the rolling bodies 8 in contact with the guide rail 10.

Biaser 24

The biaser 24 (see FIG. 3) includes a pressurizing spring 11 and an elastic body 2c. The elastic body 2c has already been described, so it will not be described again in detail here.

As shown in FIG. 3, the pressurizing spring 11 is mainly constituted by a rectangular main face 11e that is opposite the top face 10a of the guide rail 10 and presses the guide rail 10 to the shaft 5 side, and four extensions 11a, 11b, 11c, and 11d that extend to the shaft 5 side from the ends of the two long sides of the main face 11e. Furthermore, as shown in FIG. 3, prongs formed at the distal ends of the extensions 11a to 11d of the pressurizing spring 11 are mated with protrusions 4g of the third frame 53 (discussed below), thereby fixing the pressurizing spring 11 to the third frame 53.

Here, the pressurizing spring 11 is described as pressing the guide rail 10 to the shaft 5 side, but the pressurizing spring 11 need only restrict movement of the guide rail 10 to the opposite side from the shaft 5 side. Also, the pressurizing spring 11 was described as being attached so as to press directly on the guide rail 10, but an elastic member (not shown) may be sandwiched between the pressurizing spring 11 and the guide rail 10.

The attachment of the pressurizing spring 11 and the guide rail 10 will now be described through further reference to FIG. 3.

As discussed above, the four protrusions 10d are provided to the guide rail 10. When the guide rail 10 is attached to the third frame 53, the protrusions 10d are disposed in the supports 4h, which serve as receptacles. If there are gaps between the protrusions 10d of the guide rail 10 and the supports 4h of the third frame 53, the guide rail 10 may be tilted somewhat when the pressurizing spring 11 is attached, but even if this happens, since the protrusions 10d are in contact with the supports 4h, the guide rail 10 can be prevented from rotating too much. That is, since they are disposed opposite the shaft 5 via the rolling bodies 8, providing the protrusions 10d to the guide rail 10, which readily rotates around the axis of the shaft 5, makes it easier to attach the guide rail 10. Furthermore, since the pressurizing spring 11 is disposed so as to cover the guide rail 10, and the pressurizing spring 11 can be attached to the third frame 53 merely by mating the prongs at the distal ends of the extensions 11a to 11d with the protrusions 4g of the third frame 53, assembly is easier.

The biaser 24 (see FIG. 3) includes the pressurizing spring 11 that presses the bearing 23 to the shaft 5 side, and the elastic body 2c that presses the drive generator 21 to the shaft 5 side, and biases the drive generator 21 and the bearing 23 in the direction of moving closer together.

The elastic body 2c is made of silicone rubber, for example, generates elastic force by contraction, and biases the drive generator 21 to the shaft 5 side. As a result, the shaft 5 receives biasing force perpendicular to the axis from the vibration actuator 1. The shaft 5 is inserted through the insertion holes 4a and 4b. Therefore, unless the shaft 5 is supported from the opposite from the drive generator 21, a supporting force that supports the shaft 5 will be generated in the insertion holes 4a and 4b, and the shaft 5 will bend.

However, the bearing 23 that is biased by the pressurizing spring 11 is disposed on the opposite side of the shaft 5 from the drive generator 21. Therefore, the shaft 5 is supported on the opposite side from the drive generator 21, and any supporting force exerted on the shaft 5 in the insertion holes 4a and 4b is reduced or cancelled out. As a result, deformation of the shaft 5 is suppressed, sliding resistance between the insertion holes 4a and 4b and the shaft 5 is reduced, and drive efficiency is increased.

Third Frame 53

The third frame 53 (see FIG. 3) is mainly constituted by a frame 4, a support 4i that is provided to the side face of the frame 4 and supports the shaft 5 and to which the bearing 23 is fixed, and a fixing component 4j to which the drive generator 21 is fixed.

The frame 4 is a plate-shaped member, in the center of which is fixed an imaging element or other such optical component.

The insertion holes 4a and 4b are formed in the support 4i so that the shaft 5 can be inserted and supported in a direction parallel to the face of the plate-shaped frame 4 (a direction along one side). Also, the supports 4h that support the protrusions 10d formed around the outer periphery of the guide rail 10 are formed in the support 4i, and the protrusions 4g, onto which are latched the prongs at the distal ends of the extensions 11a to 11d of the pressurizing spring 11, are also formed on the support 4i.

The fixing component 4j is constituted mainly by a flat face 4c disposed opposite the actuator case 3, and a receptacle 4e that is formed at one end of the flat face 4c and supports the actuator case 3 on the shaft 5 side.

Further, the rotation stop 4f is formed on the third frame 53 at a location opposite the support 4i and with the frame 4 interposed therebetween. The rotation stop 4f supports the shaft 15, which is substantially fixed to the member to which the shaft 5 is fixed, for example, and restricts rotation of the third frame 53 around the shaft 5.

In the example given above, a case was described in which the third frame 53 is driven parallel to the face of the frame 4. That is, the description was of a case in which the third frame 53 is driven perpendicular to the optical axis direction of light incident on the imaging element disposed in the middle of the frame 4. In this case, the drive apparatus 50 can be utilized as an apparatus for correcting image blur by driving the imaging element.

Other (1) The optical component disposed on the frame 4 is not limited to an imaging element, and may be a lens or another such optical component. This will be described through reference to FIG. 7.

Figure 7:
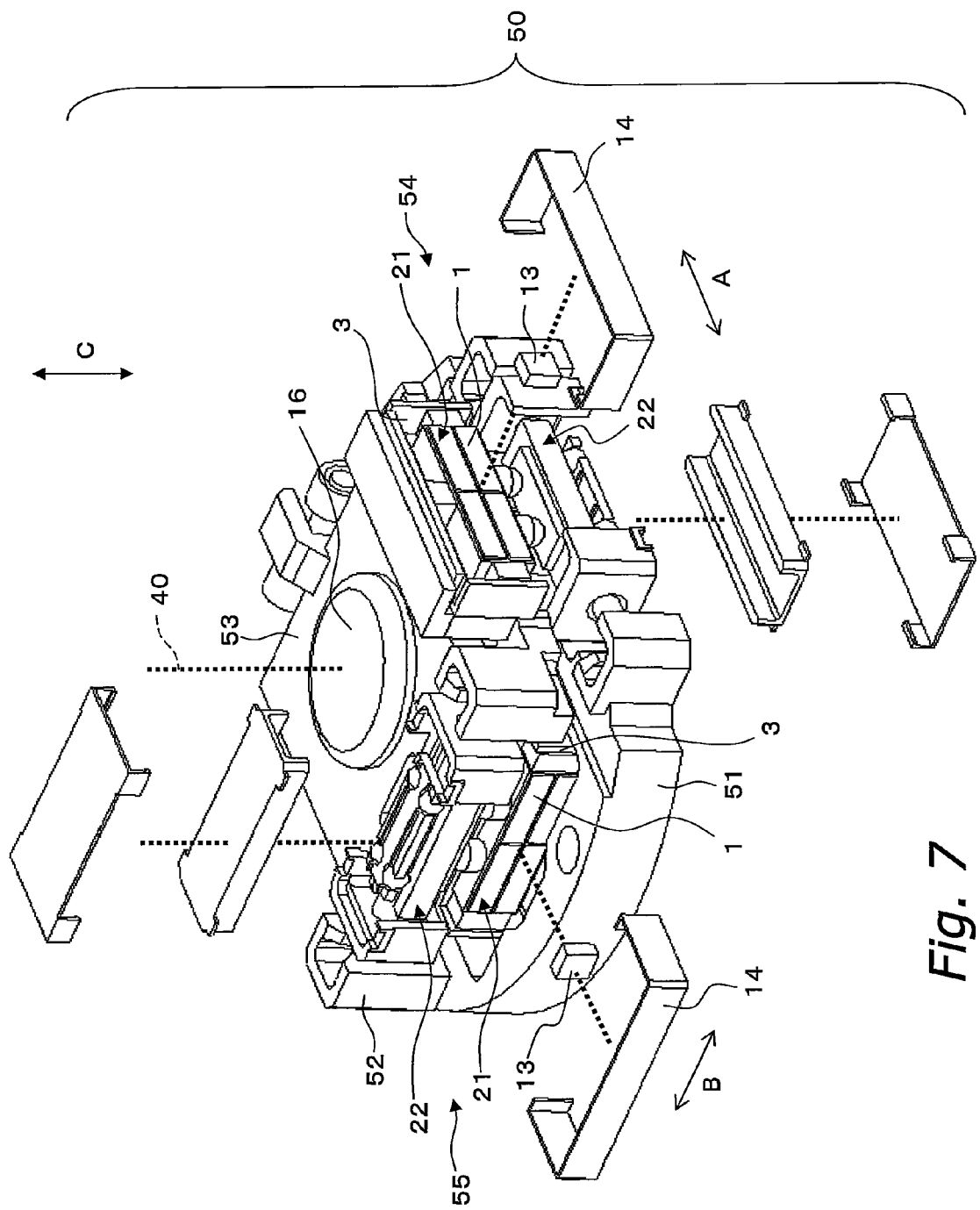
FIG. 7 is an exploded oblique view of the constitution of a drive apparatus in a modification example (first embodiment)

FIG. 7 shows a drive apparatus 50 that employs the same constitution as the drive apparatus 50 shown in FIG. 1, but in which an optical lens 16 is disposed in an opening provided to the third frame 53. The drive apparatus 50 drives the optical lens 16 in the first direction A and the second direction B with respect to the optical axis 40 of light incident along the third direction C, and corrects blurring of the image received by an imaging element disposed at a subsequent stage. An image blur correction apparatus is constituted by this drive apparatus 50, the imaging element disposed at a subsequent stage, a position sensor for sensing the position of the optical lens 16, a controller for driving the drive apparatus 50 by means of the output of the position sensor, and so forth.

With the drive apparatus 50, the first frame 51, the second frame 52, and the third frame 53 are provided with an opening that passes through in the thickness direction in order to allow the passage of the optical axis 40 incident from the optical lens 16.

The optical lens 16 is not limited to a single lens, and may instead be a lens group consisting of two or more lenses.

Figure 21:
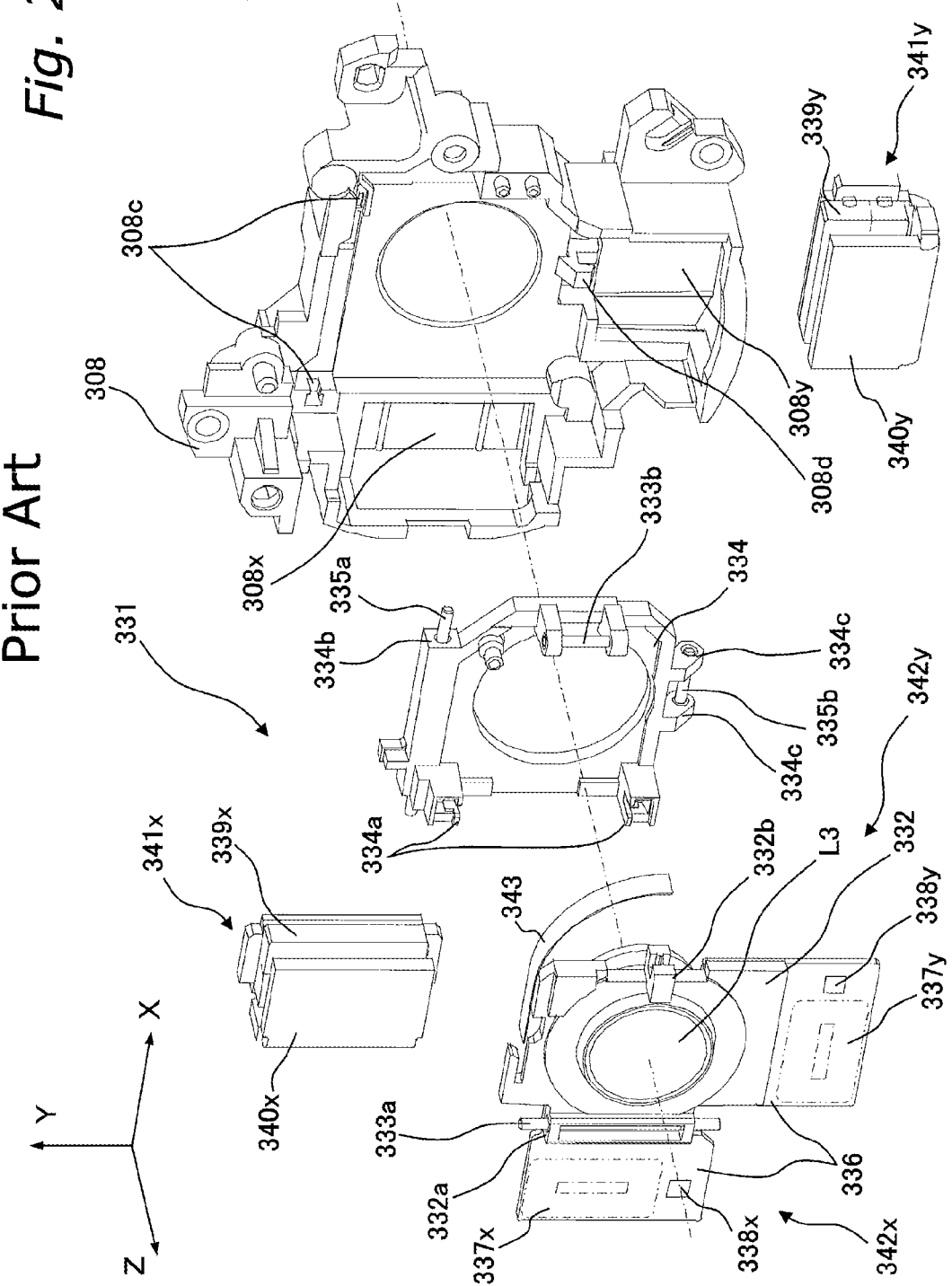
FIG. 21 is an exploded oblique view of the constitution of a drive apparatus as prior art (prior art)
Figure 22:
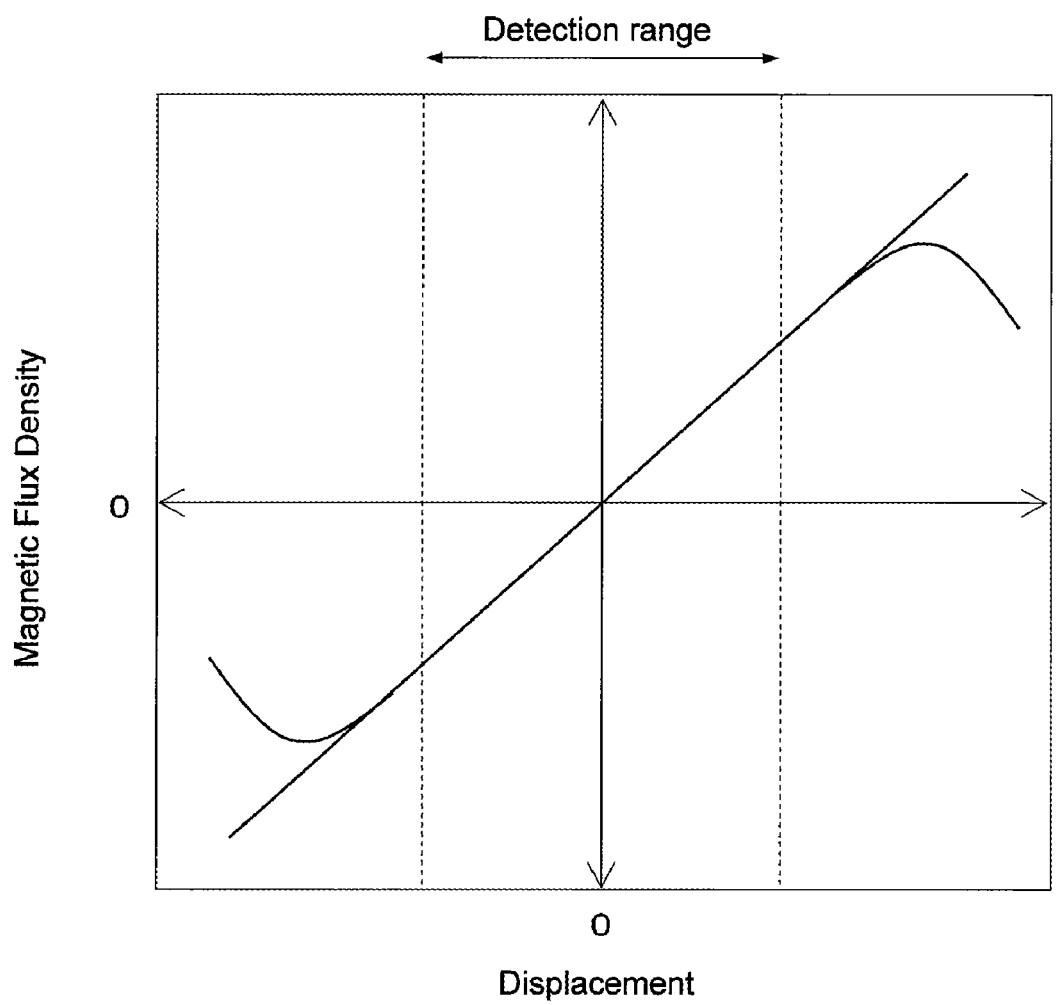
FIG. 22 is a graph of magnetic flux density versus the position of a sensor magnet (prior art)
Figure 23B:
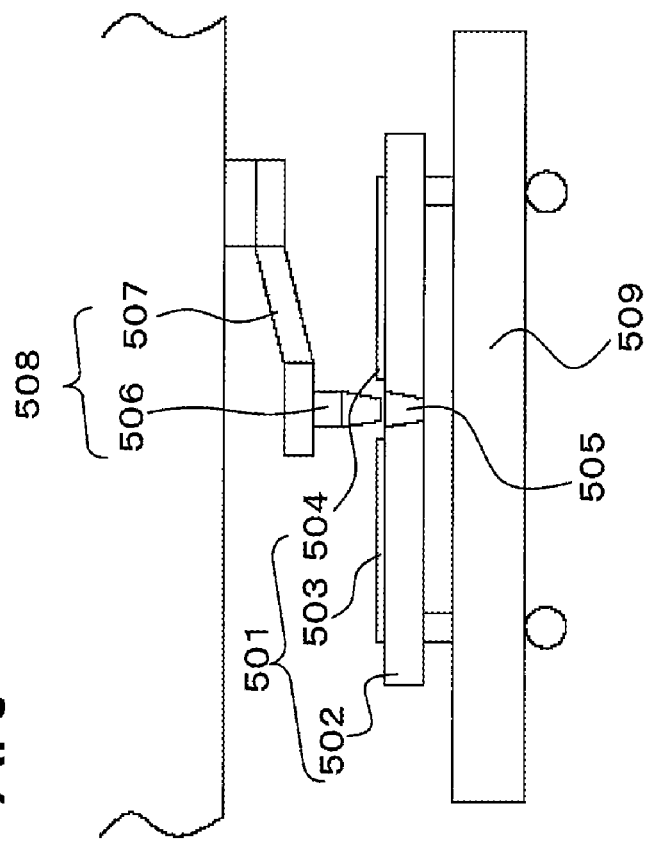
FIGS. 23A and 23B are diagrams illustrating the constitution of two drive apparatus as prior art (prior art).
Figure 23A:
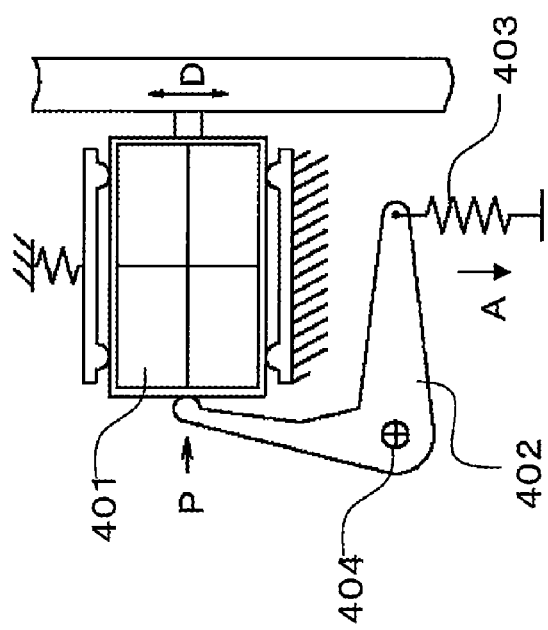

With the electromagnetic image blur correction apparatus described through reference to FIG. 21, even when image blur correction is not performed in the pitch direction that is affected by gravity (the Y direction in FIG. 21), for example, the proper position still has to be supported by sending current to the actuator. However, if the actuator is frictionally driven and the drive generator 21 imparts a biasing force to the drive receiver 22, it is possible to support the position of the optical lens 16 without sending any current. That is, with an image blur correction apparatus that features the drive apparatus 50, the optical lens 16 can be positioned and supported near the center of the optical axis 40 without the flow of current. As a result, power consumption can be reduced with this image blur correction apparatus.

(2) A member that biases the vibration actuator 1 can be provided to the above constitution in order to further improve the drive efficiency of the vibration actuator 1. This will be described in specific terms through reference to FIGS. 1 and 7 through 9.

As shown in FIGS. 1 and 7, the first drive mechanism 54 and the second drive mechanism 55 have a restricting member 14 that restricts movement to the opposite side from the actuator case 3 side in a direction perpendicular to the main face of the vibration actuator 1, and an elastic body 13 that is disposed between the main face of the vibration actuator 1 and the restricting member 14, biases the vibration actuator 1 to the actuator case 3 side, and absorbs dimensional variance of the restricting member 14.

The restricting member 14 of the first drive mechanism 54 restricts movement of the vibration actuator 1 in the second direction B. The restricting member 14 of the second drive mechanism 55 restricts movement of the vibration actuator 1 in the first direction A. Each of the vibration actuators 1 is pressed against the drive receiver 22 by the elastic body 2c (see FIG. 3), and the application of voltage produces repeated tiny vibrations. If the movement of the vibration actuator 1 to the opposite side from the actuator case 3 side were not restricted, then the orientation of the vibration actuator 1 with respect to the drive receiver 22 would change over time as a result of these tiny vibrations. This change in orientation would lead to a decrease in drive efficiency.

Meanwhile, when the first drive mechanism 54 and the second drive mechanism 55 have a restricting member 14 and an elastic body 13, so that the movement of the vibration actuator 1 is restricted, it is possible to prevent a decrease in the drive efficiency of the drive receiver 22.

Figure 8:
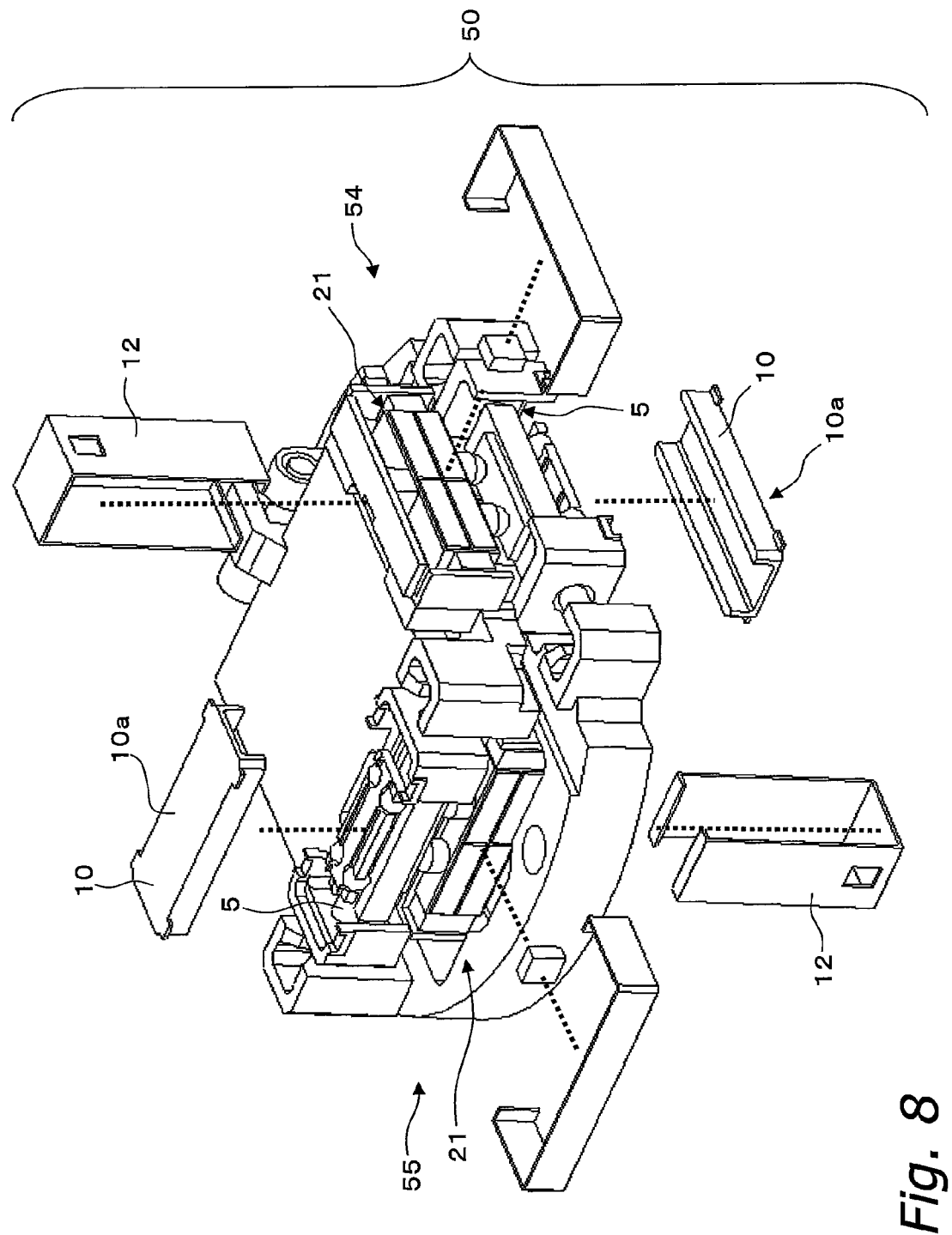
FIG. 8 is an exploded oblique view of the constitution of a drive apparatus in a modification example (first embodiment)
Figure 9:
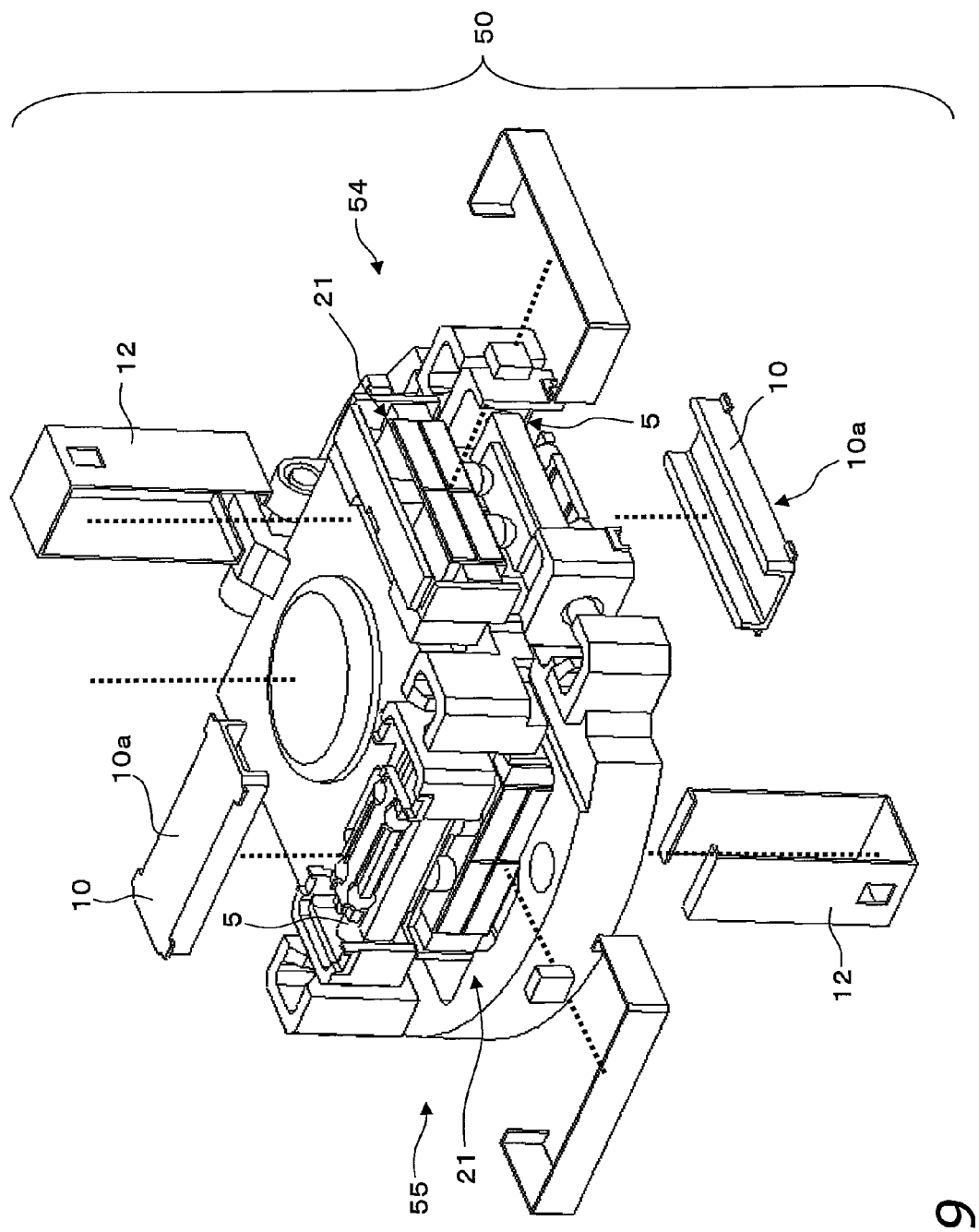
FIG. 9 is an exploded oblique view of the constitution of a drive apparatus in a modification example (first embodiment)

Also, as shown in FIGS. 8 and 9, the first drive mechanism 54 and the second drive mechanism 55 shown in FIGS. 1 and 7 may have a pressing member 12 that presses the guide rail 10 to the shaft 5 side, instead of the pressurizing spring 11. Each of the pressing members 12 is a substantially U-shaped member having at its distal ends prongs that are latched over the top face 10a of the guide rail 10, and these pressing members 12 are attached from the drive generator 21 side so as to cover the entire drive generator 21, and act to draw the guide rail 10 toward the shaft 5 side.

Second Embodiment

The drive apparatus in a second embodiment will be described. The constitution that is the same as that described for the first embodiment is numbered the same, and its description will be omitted.

Drive Apparatus 60

Figure 10:
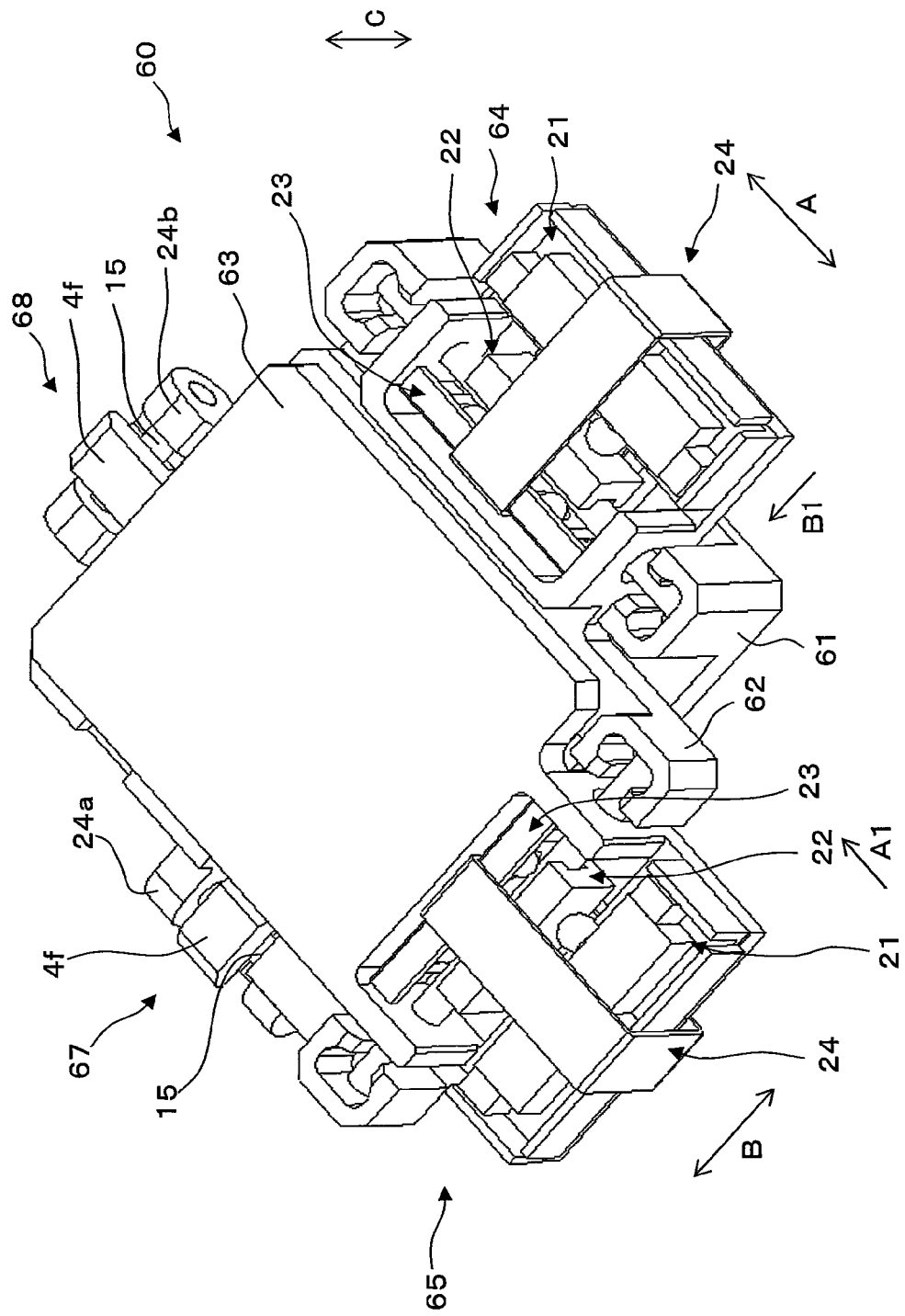
FIG. 10 is an oblique view of the constitution of a drive apparatus (second embodiment)

The drive apparatus 60 shown in FIG. 10 is installed in a digital still camera, a digital video camera, or another such optical device, and is used to drive an optical component such as a lens or a CCD, a CMOS, or another such imaging element in two directions perpendicular to the optical axis, to correct blurring of an optical image. The drive apparatus 60 shown in FIG. 10 in particular is an apparatus that has an imaging element, etc., mounted on its upper face side, and drives this element.

As shown in FIG. 10, the drive apparatus 60 comprises a first frame 61, a second frame 62, a third frame 63, a first drive mechanism 64, and a second drive mechanism 65. The second frame 62 is supported movably in a first direction A with respect to the first frame 61. The third frame 63 is supported movably in a second direction B that is perpendicular to the first direction A with respect to the second frame 62.

The first drive mechanism 64 is provided between the first frame 61 and the second frame 62, and moves the first frame 61 and the second frame 62 relatively. More specifically, the first drive mechanism 64 drives the second frame 62 in the first direction A with respect to the first frame 61 and the optical device (not shown) to which the first frame 61 is fixed.

The second drive mechanism 65 is provided between the second frame 62 and the third frame 63, and moves the second frame 62 and the third frame 63 relatively. More specifically, the second drive mechanism 65 drives the third frame 63 in the second direction B with respect to the second frame 62. The second drive mechanism 65 is disposed at a location that is rotated 90 degrees around the third direction C that is perpendicular to the first direction A and the second direction B with respect to the first drive mechanism 64.

The first drive mechanism 64 and the second drive mechanism 65 each include a drive generator 21, a drive receiver 22, a bearing 23, and a biaser 24, just as with the first drive mechanism 54 and the second drive mechanism 55 described in the first embodiment.

With the first drive mechanism 64, the drive generator 21, the drive receiver 22, and the bearing 23 are disposed in the second direction B, and they are all in substantially the same position in the third direction C.

With the second drive mechanism 65, the drive generator 21, the drive receiver 22, and the bearing 23 are disposed in the first direction A, and they are all in substantially the same position in the third direction C.

Furthermore, the positions of the first drive mechanism 64 and the second drive mechanism 65 in the third direction C are substantially the same, and they are both disposed in the same plane parallel to each of the drive receivers 22.

The drive receiver 22 of the first drive mechanism 64 is fixed to the first frame 61, and the biaser 24 and the bearing 23 supporting the drive receiver 22 are provided to the first frame 61. The drive generator 21 of the first drive mechanism 64 is elastically fixed to the second frame 62, and the drive receiver 22 of the second drive mechanism 65, the bearing 23 supporting the drive receiver 22, and the biaser 24 are provided to the second frame 62. The drive generator 21 of the second drive mechanism 65 is elastically fixed to the third frame 63.

As mentioned above, the first drive mechanism 64 and the second drive mechanism 65 are disposed on the first frame 61 to the third frame 63, and the action direction B1 in which the drive generator 21 acts on the drive receiver 22 in the first drive mechanism 64 is perpendicular to the action direction A1 in which the drive generator 21 acts on the drive receiver 22 in the second drive mechanism 65.

Thus disposing the first drive mechanism 64 and the second drive mechanism 65 at substantially the same height makes it possible to reduce the thickness of the drive apparatus 60 in the third direction C. Also, disposing the members that constitute the first drive mechanism 64 and the second drive mechanism 65 in directions perpendicular to the third direction C (the first direction A and the second direction B) makes it possible to reduce the thickness in the third direction C.

Also, the drive apparatus 60 is provided with anti-rotation mechanisms (a first anti-rotation mechanism 67 and a second anti-rotation mechanism 68) that are the same as the first anti-rotation mechanism 57 and the second anti-rotation mechanism 58 described in the first embodiment.

Other

The optical component disposed on the third frame 63 is not limited to an imaging element, and may be a lens or another such optical component. This will be described through reference to FIG. 11.

Figure 11:
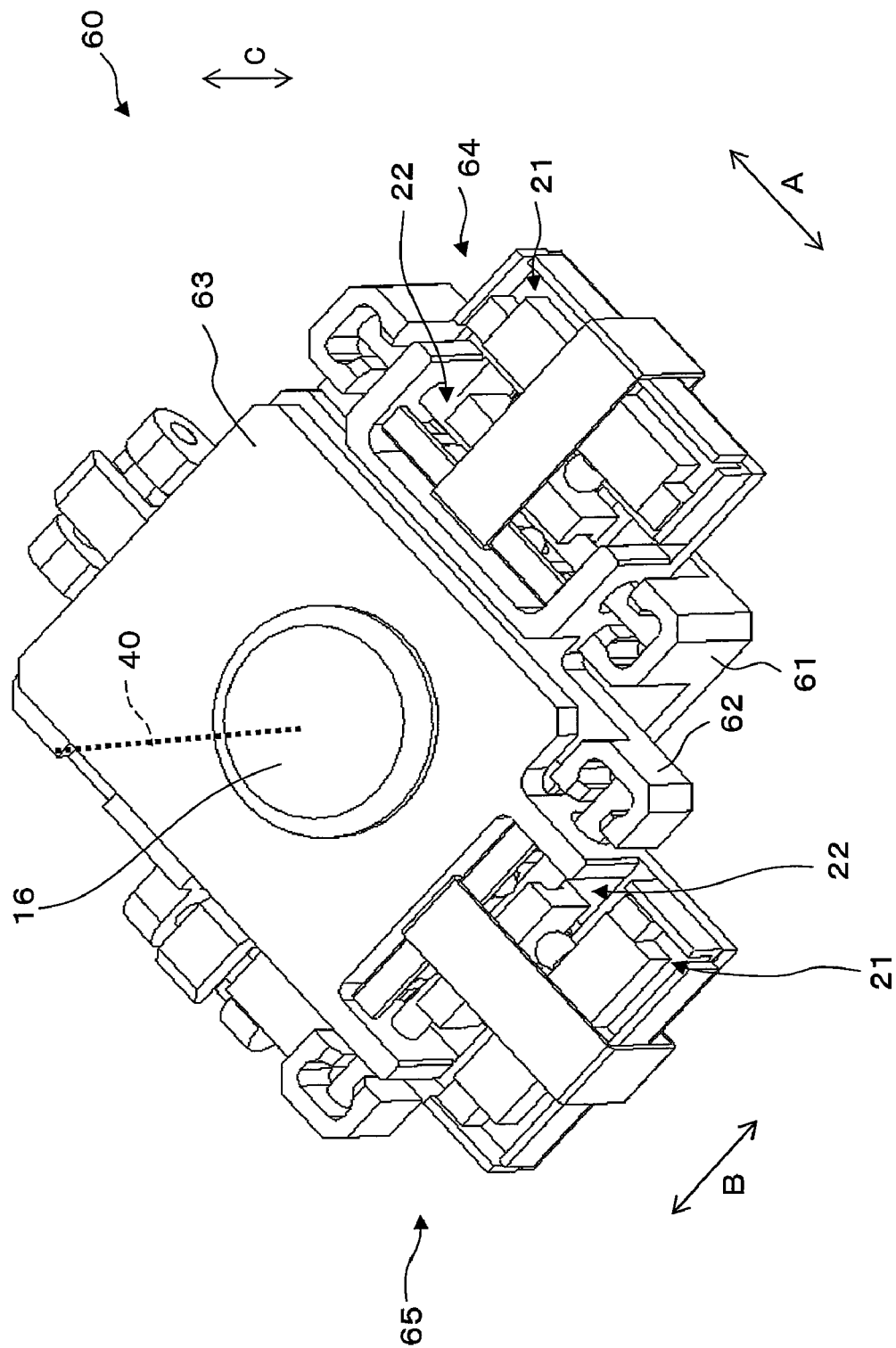
FIG. 11 is an exploded oblique view of the constitution of a drive apparatus in a modification example (second embodiment)

FIG. 11 shows a drive apparatus 60 that employs the same constitution as the drive apparatus 60 shown in FIG. 10, but in which an optical lens 16 is disposed in an opening provided to the third frame 63. The drive apparatus 60 drives the optical lens 16 in the first direction A and the second direction B with respect to the optical axis 40 of light incident along the third direction C, and corrects blurring of the image received by an imaging element disposed at a subsequent stage. An image blur correction apparatus is constituted by this drive apparatus 60, the imaging element disposed at a subsequent stage, a position sensor for sensing the position of the optical lens 16, a controller for driving the drive apparatus 60 by means of the output of the position sensor, and so forth.

With the drive apparatus 60, the first frame 61, the second frame 62, and the third frame 63 are provided with an opening that passes through in the thickness direction in order to allow the passage of the optical axis 40 incident from the optical lens 16.

The optical lens 16 is not limited to a single lens, and may instead be a lens group consisting of two or more lenses.

With the electromagnetic image blur correction apparatus described through reference to FIG. 21, even when image blur correction is not performed in the pitch direction that is affected by gravity (the Y direction in FIG. 21), for example, the proper position still has to be supported by sending current to the actuator. However, if the actuator is frictionally driven and the drive generator 21 imparts a biasing force to the drive receiver 22, it is possible to support the position of the optical lens 16 without sending any current. That is, with an image blur correction apparatus that features the drive apparatus 60, the optical lens 16 can be positioned and supported near the center of the optical axis 40 without the flow of current. As a result, power consumption can be reduced with this image blur correction apparatus.

Third Embodiment

The drive apparatus in a third embodiment will be described.

Figure 12:
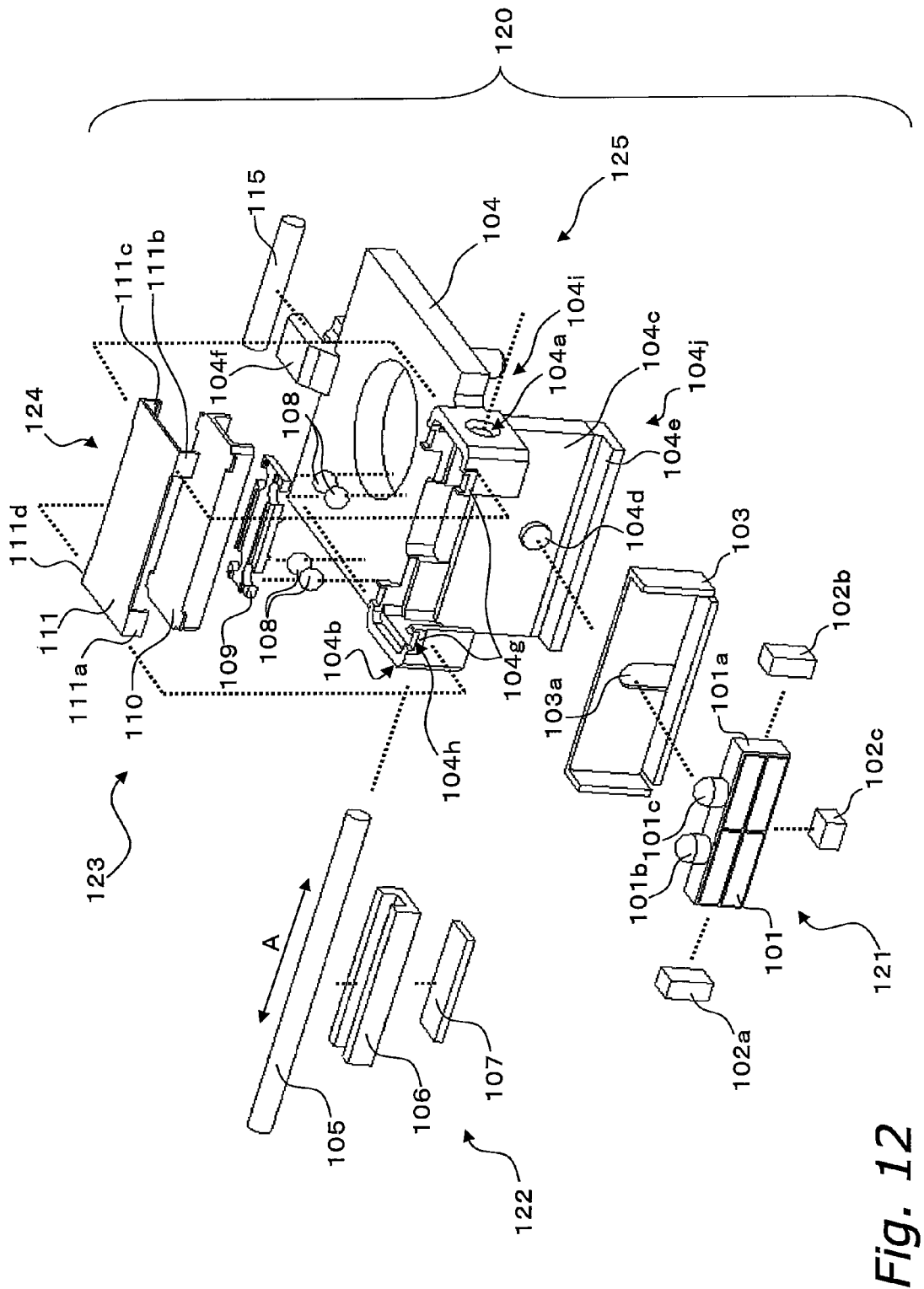
FIG. 12 is an exploded oblique view of the constitution of a drive apparatus (third embodiment)

FIG. 12 is an exploded oblique view of the drive apparatus 120 in a third embodiment.

The drive apparatus 120 includes a drive generator 121, a sliding member (relative drive component) 122, a bearing (restrictor) 123, a biaser 124, and a main body 125.

The drive generator 121 generates drive with a piezoelectric element or another such electro-mechanical conversion element, for example. The sliding member 122 receives the drive generated by the drive generator 121, and is driven relative to the drive generator 121. The bearing 123 is disposed opposite the drive generator 121 with the sliding member 122 interposed therebetween, and restricts displacement of the sliding member 122 to the opposite side from the drive generator 121 side where the drive generator 121 acts on the sliding member 122. The biaser 124 biases the drive generator 121 and the bearing 123 in the direction of moving closer together. The main body 125 supports the drive generator 121 and is driven relative to the sliding member 122.

The constitutions of the various components above will now be described in further detail.

Drive Generator 121

Figure 13:
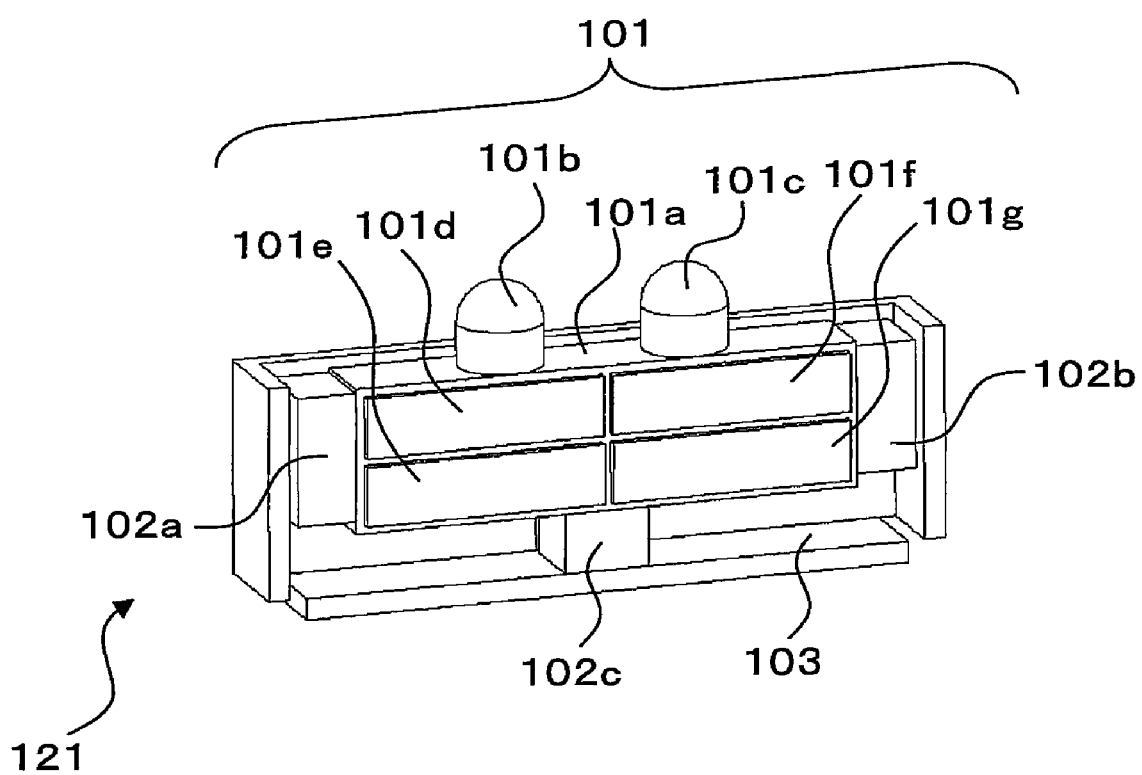
FIG. 13 is an oblique view of the constitution of a drive generator (third embodiment)

FIG. 13 is an oblique view of the drive generator 121 with which the drive apparatus 120 is equipped.

The drive generator 121 is constituted mainly by a vibration actuator 101, elastic bodies 102a to 102c, and an actuator case 103.

The vibration actuator 101 is constituted mainly by a piezoelectric element 101a that is cuboid in shape, two drivers 101b and 101c that are disposed on the side face of the long side of the face of the piezoelectric element 101a having the largest surface area (hereinafter referred to as the main face) and that come into frictional contact with the sliding member 122, and four electrodes 101d to 101g formed on the main face.

The piezoelectric element 101a is a member made primarily of a ceramic or the like. The piezoelectric element 101a generates drive force when AC voltages of different phase are applied to two pairs of diagonally opposite electrodes 101d and 101g, and 101e and 101f, which results in longitudinal vibration and curved vibration being generated harmonically. The application of voltage is performed using a flexible printed board (not shown) connected to the electrodes 101d to 101g. The drivers 101b and 101c are made of a ceramic material, for example, whose heads that come into contact with the sliding member 122 are formed in a hemispherical shape. The drivers 101b and 101c are fixed to the piezoelectric element 101a, and transmit the drive force generated by the piezoelectric element 101a to the sliding member 122. The shape of the heads of the drivers 101b and 101c is not limited to the hemispherical shape shown in the drawing, and may be formed in another curved surface shape, and any shape is acceptable as long as it raises drive efficiency.

The elastic bodies 102a and 102b elastically support the side faces on the short sides of the main face of the piezoelectric element 101a from both sides. The elastic body 102c elastically supports a side face on the long side of the main face of the piezoelectric element 101a on the sliding member 122 side. The elastic bodies 102a to 102c are made of rubber, felt, or the like, and generate a biasing force by undergoing elastic deformation. The elastic bodies 102a to 102c maintain the orientation of the vibration actuator 101 with respect to the sliding member 122, and serve to raise drive efficiency when the vibration actuator 101 drives the sliding member 122. The elastic body 102c, along with a pressurizing spring 111 (discussed below), constitutes the biaser 124, which biases the drive generator 121 and the bearing 123 in the direction of moving closer together (see FIG. 12).

The actuator case 103 integrally supports the elastic bodies 102a to 102c and the vibration actuator 101. More specifically, the vibration actuator 101 is fixed via the elastic bodies 102a to 102c to the inside of the actuator case 103. A through-hole 103a that passes through the actuator case 103 in its thickness direction is formed on the face that is opposite the face of the piezoelectric element 101a on the opposite side from its main face (see FIG. 12). The actuator case 103 is disposed opposite a flat face 104c by mating the through-hole 103a with a protrusion 104d formed on the flat face 104c of the main body 125 (discussed below). As a result, the elastic bodies 102a to 102c and the vibration actuator 101 fixed inside the actuator case 103 are positioned with respect to the main body 125 and the members disposed on the main body 125. More specifically, they are disposed so that the drivers 101b and 101c of the vibration actuator 101 will be in contact with the shaft 105, a base 106, and a ceramic plate 107 of the sliding member 122. At this point, since the elastic body 102c contracts somewhat, the drivers 101b and 101c of the vibration actuator 101 press on the ceramic plate 107 while in contact therewith.

Sliding Member 122

The sliding member 122 (see FIG. 12) is mainly constituted by a stainless steel shaft 105, a base 106 that is fixed to the shaft 105, and a ceramic plate 107 that is affixed to the face of the base 106 that is opposite the drive generator 121. The shaft 105 is inserted into insertion holes 104a and 104b in the main body 125 (discussed below), and is driven relative to the axial direction of the shaft 105 (the direction indicated by A) with respect to the main body 125. The base 106 is bonded and fixed by an adhesive at the center position of the shaft 105 that has been inserted into the insertion holes 104a and 104b, between the insertion holes 104a and 104b, or is fixed by chemical joining of different kinds of material.

The heads of the drivers 101b and 101c are formed in a hemispherical shape. Therefore, to drive the sliding member 122 more efficiently, it is preferable for the drivers 101b and 101c to come into direct contact with the flat ceramic plate 107 fixed to the shaft 105, rather than the drivers 101b and 101c coming into direct contact with the cylindrical shaft 105. Assembly will be easier if the drivers 101b and 101c and the sliding member 122 come into contact via the flat ceramic plate 107.

If the drivers 101b and 101c have a shape that curves in the sliding direction (the axial direction of the shaft 105), drive efficiency will not suffer that much even if the drivers 101b and 101c come into contact with the arced portion of the cylindrical shaft 105. However, the drive generator 121 generates high-frequency drive, and the transmission of drive from the drive generator 121 to the sliding member 122 is by friction, so if the drivers 101b and 101c, which are formed from a ceramic material, come into direct contact with the shaft 105, which is formed from a metal material, there will be considerable wear of the contact parts. If the drive apparatus 120 is installed in an apparatus that permits such things as a decrease in drive efficiency or dust produced by wear of the shaft 105, then it is also possible to adopt a configuration such as bringing the drivers 101b and 101c into direct contact with the cylindrical shaft 105, or making a D-cut in the shaft 105 and bringing the flat part thereof into direct contact with the drivers 101b and 101c.

However, if the drive apparatus 120 is installed in an apparatus that does not permit such things as a decrease in drive efficiency or dust produced by wear of the shaft 105, then the contact parts will have to be made of a material that is resistant to wear. On the other hand, if the shaft 105 is made of a ceramic material, it will be difficult to polish the ceramic material, which is very hard, into a cylindrical shape with good accuracy, and this drives up the cost. Consequently, with the drive apparatus 120, a configuration is employed in which the shaft 105 is made of a metal material that poses no problems with cost or the like and can be easily and accurately polished, while the ceramic plate 107 is fixed to this shaft 105. When the base 106 is made of a ceramic material, the ceramic plate 107 need not be provided.

Bearing 123

The bearing 123 (see FIG. 12) is a member that is disposed opposite the drive generator 121 with the shaft 105 interposed therebetween, and restricts bending of the shaft 105 caused by drive of the drive generator 121. The bearing 123 includes four spherical rolling bodies 108 that come into contact with the shaft 105 and serve to decrease sliding resistance of the bearing 123 with respect to the shaft 105, a rolling element supporter 109 that supports the rolling bodies 108, and a guide rail 110 that guides the rolling bodies 108 and the rolling element supporter 109.

Figure 14:
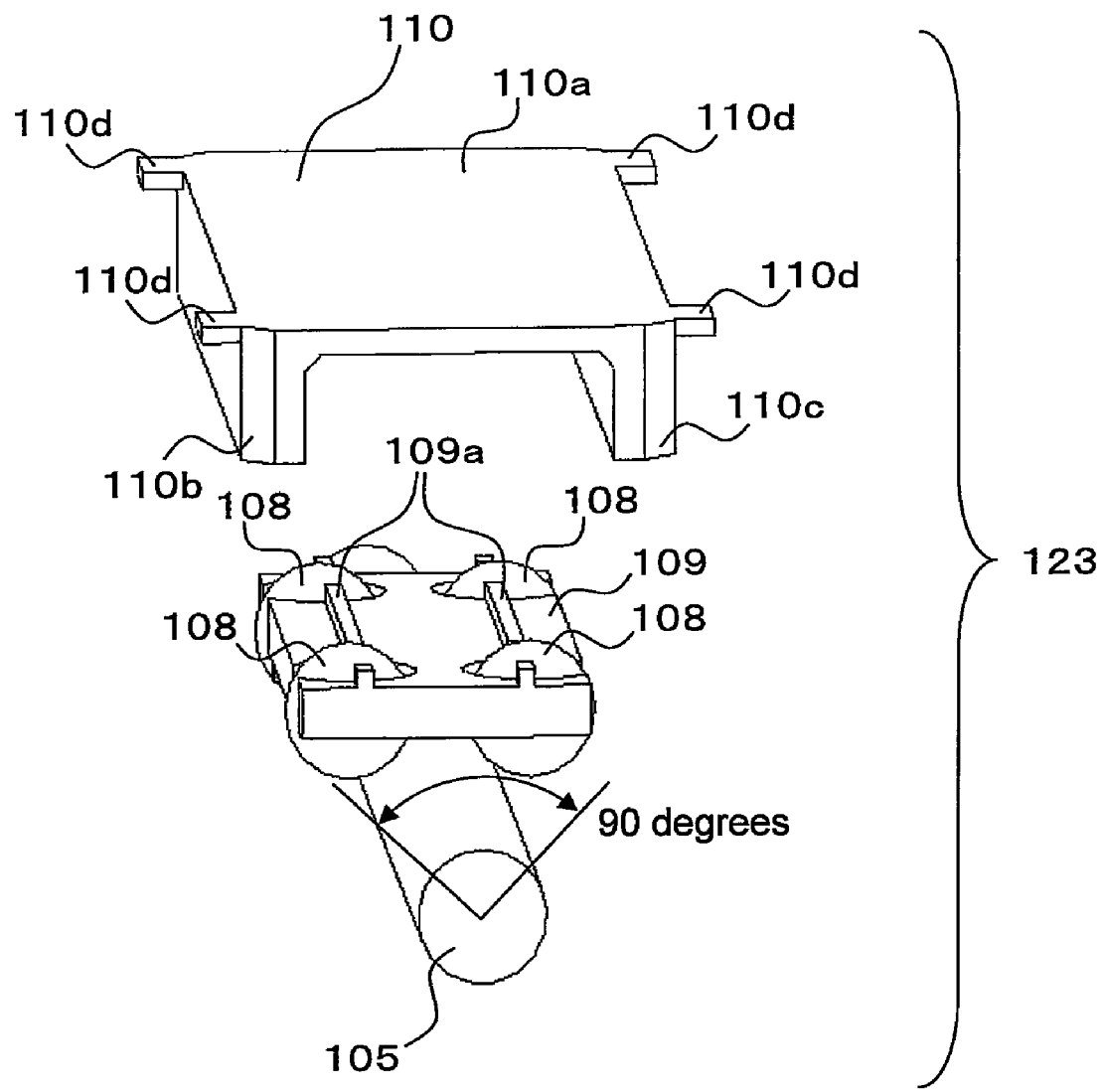
FIG. 14 is an exploded oblique view of the constitution of a bearing (third embodiment)
Figure 15:
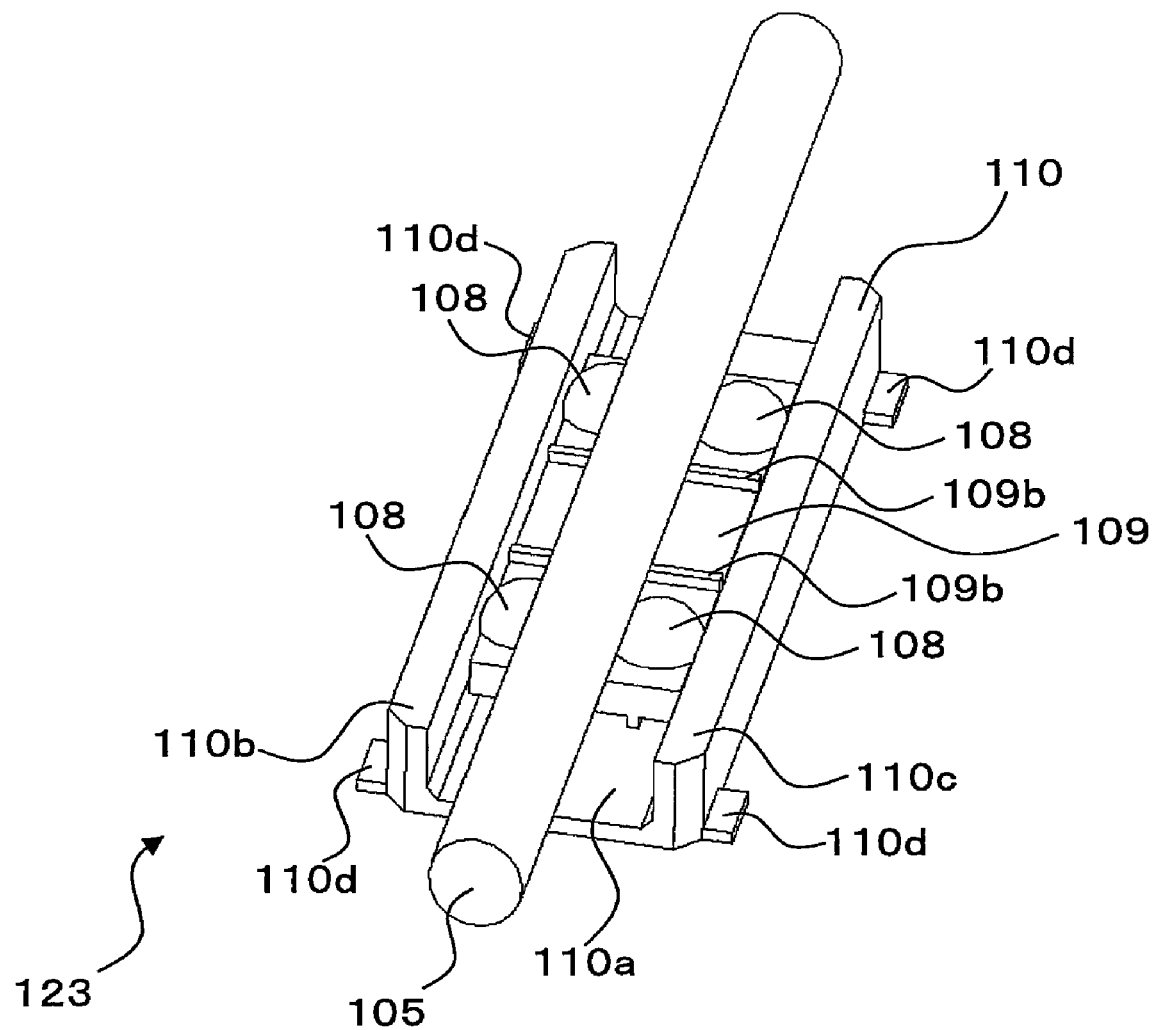
FIG. 15 is an oblique view of the constitution of a bearing (third embodiment)

The configuration of the bearing 123 will be described in detail through reference to FIGS. 14 and 15. FIG. 14 is a detail view of the bearing 123, and shows a state in which the guide rail 110 has been removed from the bearing 123. FIG. 15 is an oblique view of the bearing 123 as seen from below (the drive generator 121 side).

The rolling bodies 108 consist of steel balls, and four of them are disposed in the bearing 123. When safety of the bearing 123 is considered, it is sufficient for four of the rolling bodies 108 to be disposed, but more may be used instead. Furthermore, the rolling bodies 108 need not consist of steel balls, and as long as they are safe and reduce the sliding load, they may be made from any other material.

The rolling element supporter 109 is a substantially cuboid member, and is made from a resin with good sliding properties, such as polyacetal (POM) or polyphenylene sulfide (PPS). The rolling element supporter 109 has circular openings for supporting the rolling bodies 108 at its four corners. The openings pass through the rolling element supporter 109 in its thickness direction, and open out on the side faces of the long sides of the rolling element supporter 109. The rolling bodies 108 are disposed on the inside of the openings, and their movement is restricted in a direction perpendicular to the thickness direction of the rolling element supporter 109. Also, a part of each of the rolling bodies 108 protrudes from the side faces of the long sides of the rolling element supporter 109.

The rolling element supporter 109 is disposed opposite the shaft 105 in a state in which the rolling bodies 108 have been supported in their through-holes. At this point, the rolling element supporter 109 supports the rolling bodies 108 so that the rolling bodies 108 aligned in the short-side direction are disposed at an aperture angle of approximately 90° with respect to the axis of the shaft 105.

The guide rail 110 is a substantially U-shaped member disposed so as to cover the rolling element supporter 109, which is in a state of supporting the rolling bodies 108, from the opposite side from the shaft 105. The guide rail 110 has a top face 110a and two side faces 110b and 110c extending substantially perpendicular to the top face 110a from two opposite sides of the top face 110a.

The rolling bodies 108 supported by the rolling element supporter 109 are in contact with and roll on the top face 110a and the side face 110b, or the top face 110a and the side face 110c, of the guide rail 110. Therefore, repulsion from the shaft 105 is uniformly transmitted through the rolling bodies 108 to the top face 110a and the side faces 110b and 110c, and the sliding load is markedly reduced.

Protrusions 109a and 109b are formed on the faces of the rolling element supporter 109 on the shaft 105 side and the guide rail 110 side in order to reduce sliding resistance with the shaft 105 or the guide rail 110. The protrusion 109a (see FIG. 14) extends from the face of the rolling element supporter 109 on the guide rail 110 side, in the axial direction of the shaft 105. Also, a plurality (two, for example) of the protrusions 109a are formed lined up perpendicular to the axial direction of the shaft 105. A protrusion 109b (see FIG. 15) is formed on the face of the rolling element supporter 109 on the shaft 105 side. More specifically, the protrusion 109b extends perpendicular to the axial direction of the shaft 105 from a central position between the openings lined up in the axial direction of the shaft 105. Also, a plurality (two, for example) of the protrusions 109b are formed lined up in the axial direction of the shaft 105.

The protrusions 109a are formed parallel to the sliding direction when the rolling element supporter 109 and the guide rail 110 slide, so there is less contact surface area, and sliding resistance can be reduced. Also, since the protrusions 109b are formed perpendicular to the sliding direction when the rolling element supporter 109 and the shaft 105 slide, there is less contact surface area, and sliding resistance can be reduced. This improves the overall sliding characteristics of the bearing 123.

Figure 16:
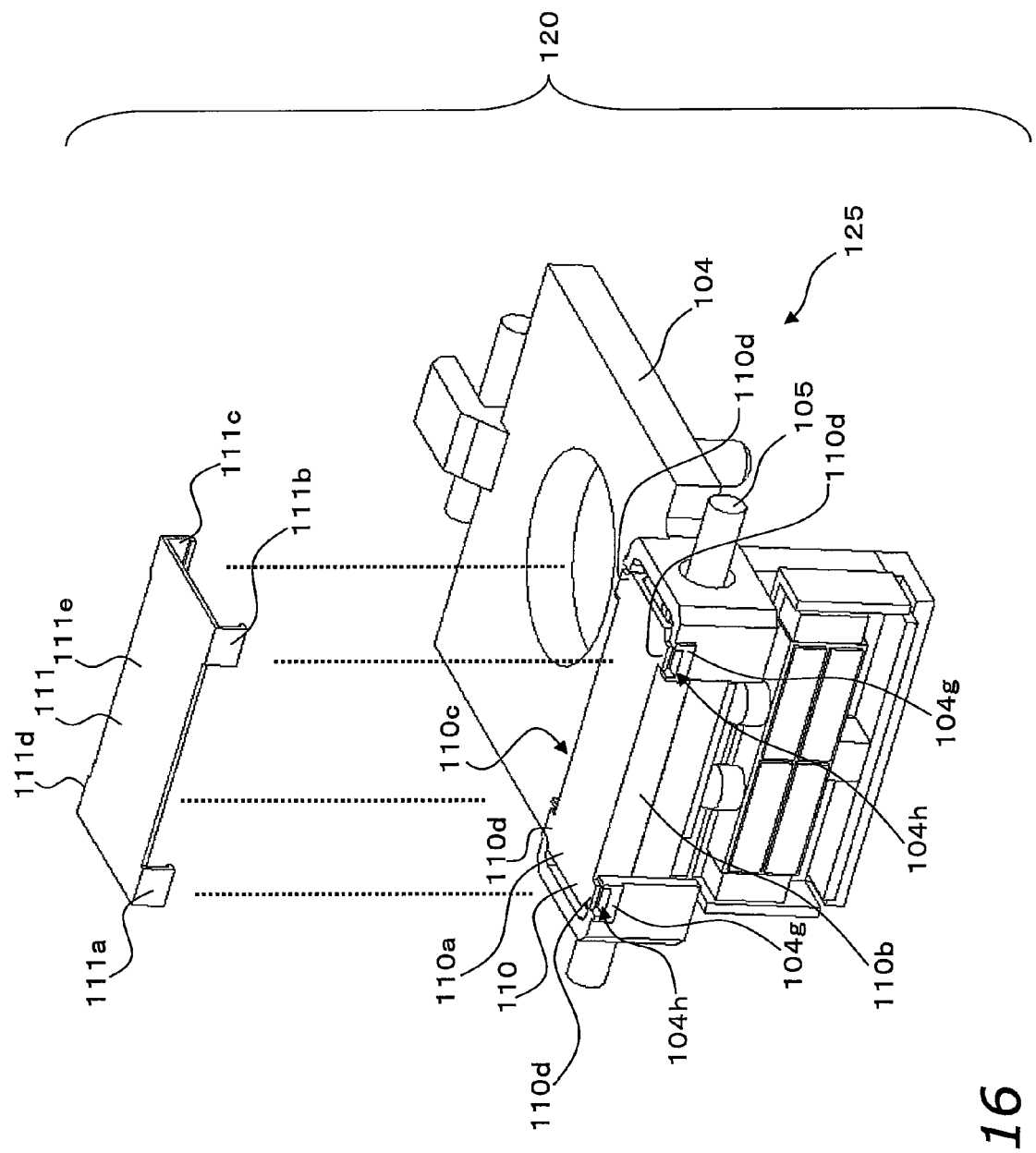
FIG. 16 is an oblique view of the attachment of a bearing and a biaser (third embodiment)

As shown in FIG. 16, four protrusions 110d extending from the side faces 110b and 110c are formed at the four corners of the top face 110a of the guide rail 110. As shown in FIG. 16, the protrusions 110d are fitted into supports 104h of the main body 125 (discussed below), which maintains the orientation of the guide rail 110. More specifically, with the guide rail 110, the protrusions 110d formed at the four corners are supported by the supports 104h, so rotation around the shaft 105 is restricted. This also makes it possible to restrict rotation around the shaft 105 of the rolling element supporter 109 and the rolling bodies 108 in contact with the guide rail 110.

Biaser 124

The biaser 124 (see FIG. 12) includes a pressurizing spring 111 and an elastic body 102c. The elastic body 102c has already been described, so it will not be described again in detail here.

Figure 17:
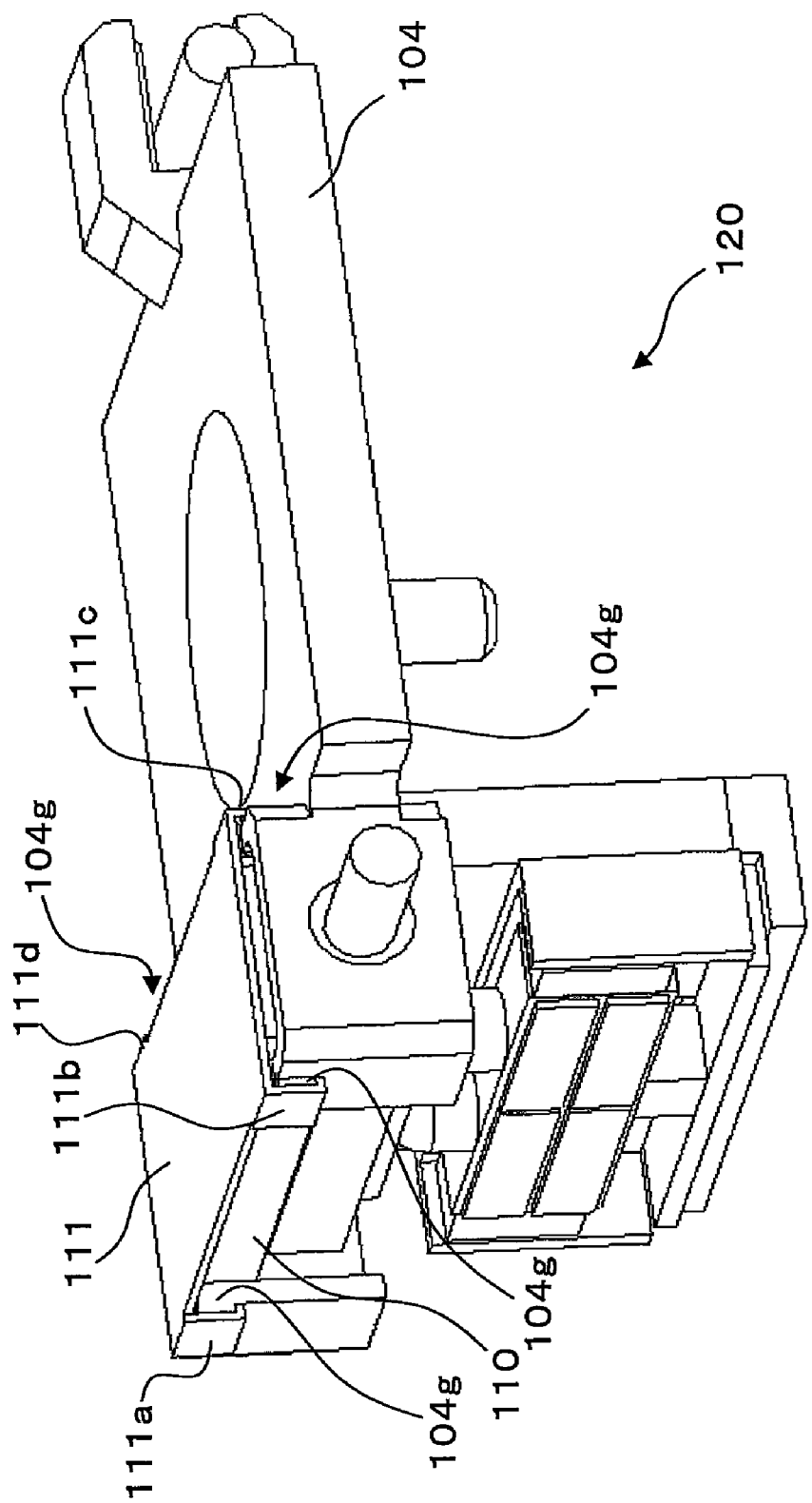
FIG. 17 is an oblique view of the attachment of a bearing and a biaser (third embodiment)

As shown in FIG. 16, the pressurizing spring 111 is mainly constituted by a rectangular main face 111e that is opposite the top face 110a of the guide rail 110 and presses the guide rail 110 to the shaft 105 side, and four extensions 111a, 111b, 111c, and 111d that extend to the shaft 105 side from the ends of the two long sides of the main face 111e. Furthermore, as shown in FIG. 17, prongs formed at the distal ends of the extensions 111a to 111d of the pressurizing spring 111 are mated with protrusions 104g of the main body 125 (discussed below), thereby fixing the pressurizing spring 111 to the main body 125.

Here, the pressurizing spring 111 is described as pressing the guide rail 110 to the shaft 105 side, but the pressurizing spring 111 need only restrict movement of the guide rail 110 to the opposite side from the shaft 105 side. Also, the pressurizing spring 111 was described as being attached so as to press directly on the guide rail 110, but an elastic member (not shown) may be sandwiched between the pressurizing spring 111 and the guide rail 110.

The attachment of the pressurizing spring 111 and the guide rail 110 will now be described through further reference to FIG. 16.

As discussed above, the four protrusions 110d are provided to the guide rail 110. When the guide rail 110 is attached to the main body 125, the protrusions 110d are disposed in the supports 104h, which serve as receptacles. If there are gaps between the protrusions 110d of the guide rail 110 and the supports 104h of the main body 125, the guide rail 110 may be tilted somewhat when the pressurizing spring 111 is attached, but even if this happens, since the protrusions 110d are in contact with the supports 104h, the guide rail 110 can be prevented from rotating too much. That is, since they are disposed opposite the shaft 105 via the rolling bodies 108, providing the protrusions 110d to the guide rail 110, which readily rotates around the axis of the shaft 105, makes it easier to attach the guide rail 110. Furthermore, since the pressurizing spring 111 is disposed so as to cover the guide rail 110, and the pressurizing spring 111 can be attached to the main body 125 merely by mating the prongs at the distal ends of the extensions 111a to 111d with the protrusions 104g of the main body 125, assembly is easier.

The biaser 124 (see FIG. 12) includes the pressurizing spring 111 that presses the bearing 123 to the shaft 105 side, and the elastic body 102c that presses the drive generator 121 to the shaft 105 side, and biases the drive generator 121 and the bearing 123 in the direction of moving closer together.

The elastic body 102c is made of silicone rubber, for example, generates elastic force by contraction, and biases the drive generator 121 to the shaft 105 side. As a result, the shaft 105 receives biasing force perpendicular to the axis from the vibration actuator 101. The shaft 105 is inserted through the insertion holes 104a and 104b. Therefore, unless the shaft 105 is supported from the opposite from the drive generator 121, a supporting force that supports the shaft 105 will be generated in the insertion holes 104a and 104b, and the shaft 105 will bend.

However, the bearing 123 that is biased by the pressurizing spring 111 is disposed on the opposite side of the shaft 105 from the drive generator 121. Therefore, the shaft 105 is supported on the opposite side from the drive generator 121, and any supporting force exerted on the shaft 105 in the insertion holes 104a and 104b is reduced or cancelled out. As a result, deformation of the shaft 105 is suppressed, sliding resistance between the insertion holes 104a and 104b and the shaft 105 is reduced, and drive efficiency is increased.

Main Body 125

The main body 125 (see FIG. 12) is mainly constituted by a frame 104, a support 104i that is provided to the frame 104 and supports the shaft 105 and to which the bearing 123 is fixed, and a fixing component 104j to which the drive generator 121 is fixed.

The frame 104 is a plate-shaped member, in the center of which is fixed a lens or other such optical component.

The insertion holes 104a and 104b are formed in the support 104i so that the shaft 105 can be inserted and supported in a direction parallel to the face of the plate-shaped frame 104 (a direction along one side). Also, the supports 104h that support the protrusions 110d formed around the outer periphery of the guide rail 110 are formed in the support 104i, and the protrusions 104g, onto which are latched the prongs at the distal ends of the extensions 111a to 111d of the pressurizing spring 111, are also formed on the support 104i.

The fixing component 104j is constituted mainly by a flat face 104c disposed opposite the actuator case 103, and a receptacle 104e that is formed at one end of the flat face 104c and supports the actuator case 103 on the shaft 105 side.

Further, the rotation stop 104f is formed on the main body 125 at a location opposite the support 104i and with the frame 104 interposed therebetween. The rotation stop 104f supports the shaft 115, which is substantially fixed to the member to which the shaft 105 is fixed, for example, and restricts rotation of the main body 125 around the shaft 105.

In the example given above, a case was described in which the main body 125 moves along the shaft 105. However, if the frame 104 is fixed, the shaft 105, the base 106, and the ceramic plate 107 of the sliding member 122 can be driven.

In the example given above, a case was described in which the main body 125 is driven parallel to the face of the frame 104. That is, the description was of a case in which the main body 125 is driven perpendicular to the optical axis direction of the lens disposed in the middle of the frame 104. In this case, the drive apparatus 120 can be utilized as an apparatus for correcting image blur by driving the lens. However, with a structure in which the support 104i supports the shaft 105 in the direction of the optical axis of the lens (perpendicular to the face of the frame 104), the drive apparatus 120 can be used as an apparatus for driving optical components in the optical axis direction, such as a focus adjusting apparatus.

The optical component disposed on the frame 104 is not limited to a lens, and may instead be a CCD, a CMOS, or another such imaging element.

Other

A member that biases the vibration actuator 101 can be provided to the above constitution in order to further improve the drive efficiency of the vibration actuator 101. This will be described in specific terms through reference to FIG. 18.

Figure 18:
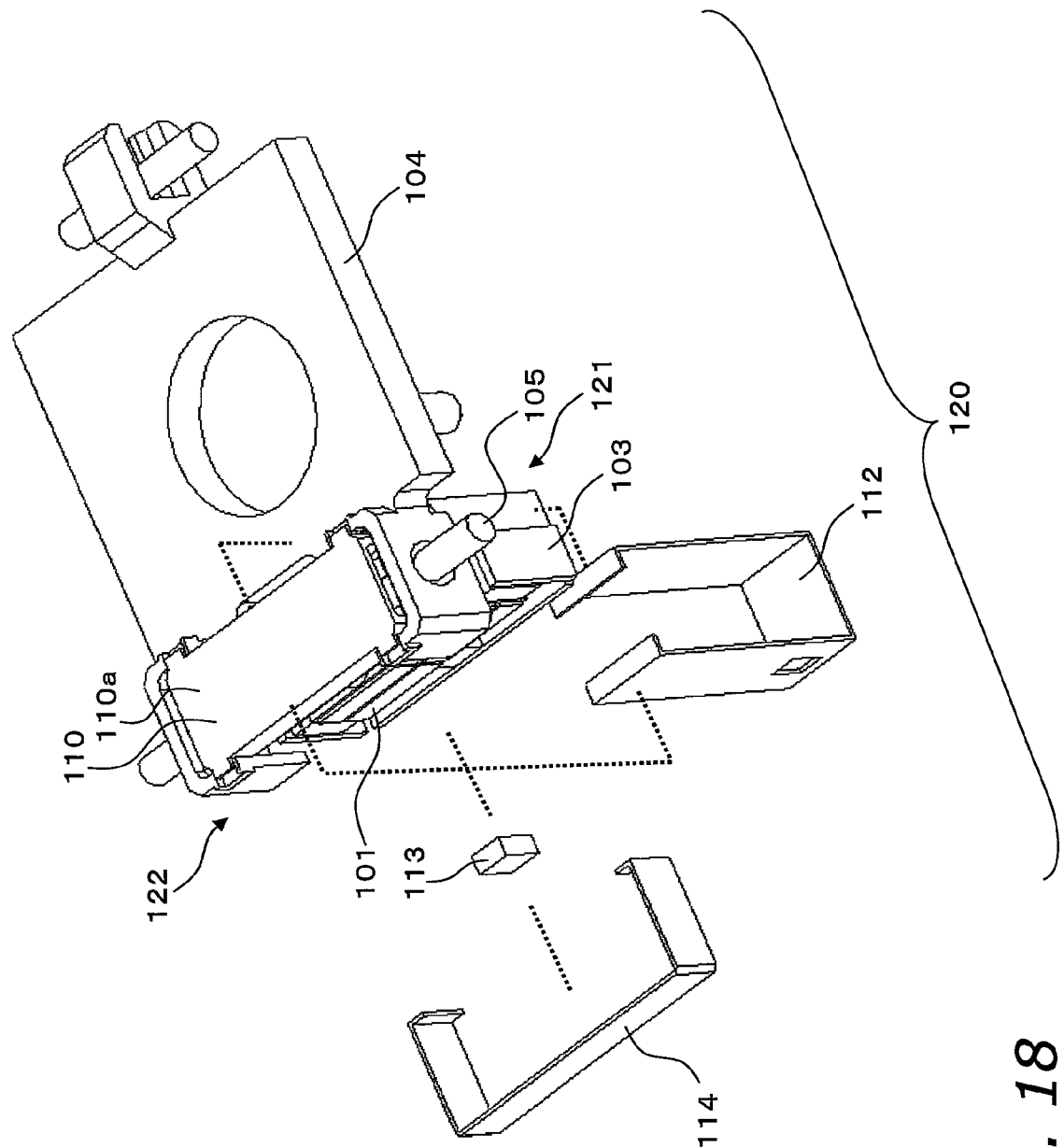
FIG. 18 is an exploded oblique view of another constitution of a drive apparatus (third embodiment)

As shown in FIG. 18, the drive apparatus 120 has a restricting member 114 that restricts movement to the opposite side from the actuator case 103 side in a direction perpendicular to the main face of the vibration actuator 101, and an elastic body 113 that is disposed between the main face of the vibration actuator 101 and the restricting member 114, biases the vibration actuator 101 to the actuator case 103 side, and absorbs dimensional variance of the restricting member 114.

The restricting member 114 restricts movement of the vibration actuator 101 in a direction perpendicular to the direction in which the sliding member 122 comes into contact with the drives 101b and 101c of the vibration actuator 101. The vibration actuator 101 is pressed against the sliding member 122 by the elastic body 102c (see FIG. 12), and the application of voltage produces repeated tiny vibrations. If the movement of the vibration actuator 101 to the opposite side from the actuator case 103 side were not restricted, then the orientation of the vibration actuator 101 with respect to the sliding member 122 would change over time as a result of these tiny vibrations. This change in orientation would lead to a decrease in drive efficiency.

Meanwhile, when the drive apparatus 120 has a restricting member 114 and an elastic body 113, so that the movement of the vibration actuator 101 is restricted, it is possible to prevent a decrease in the drive efficiency of the sliding member 122.

Also, in FIG. 18, instead of the pressurizing spring 111, there is a pressing member 112 that presses the guide rail 110 to the shaft 105 side. Each of the pressing members 112 is a substantially U-shaped member having at its distal ends prongs that are latched over the top face 110a of the guide rail 110, and these pressing members 112 are attached from the drive generator 121 side so as to cover the entire drive generator 121, and act to draw the guide rail 110 toward the shaft 105 side. It should go without saying, but the drive apparatus 120 may also have the pressurizing spring 111 instead of the pressing member 112.

Figure 19:
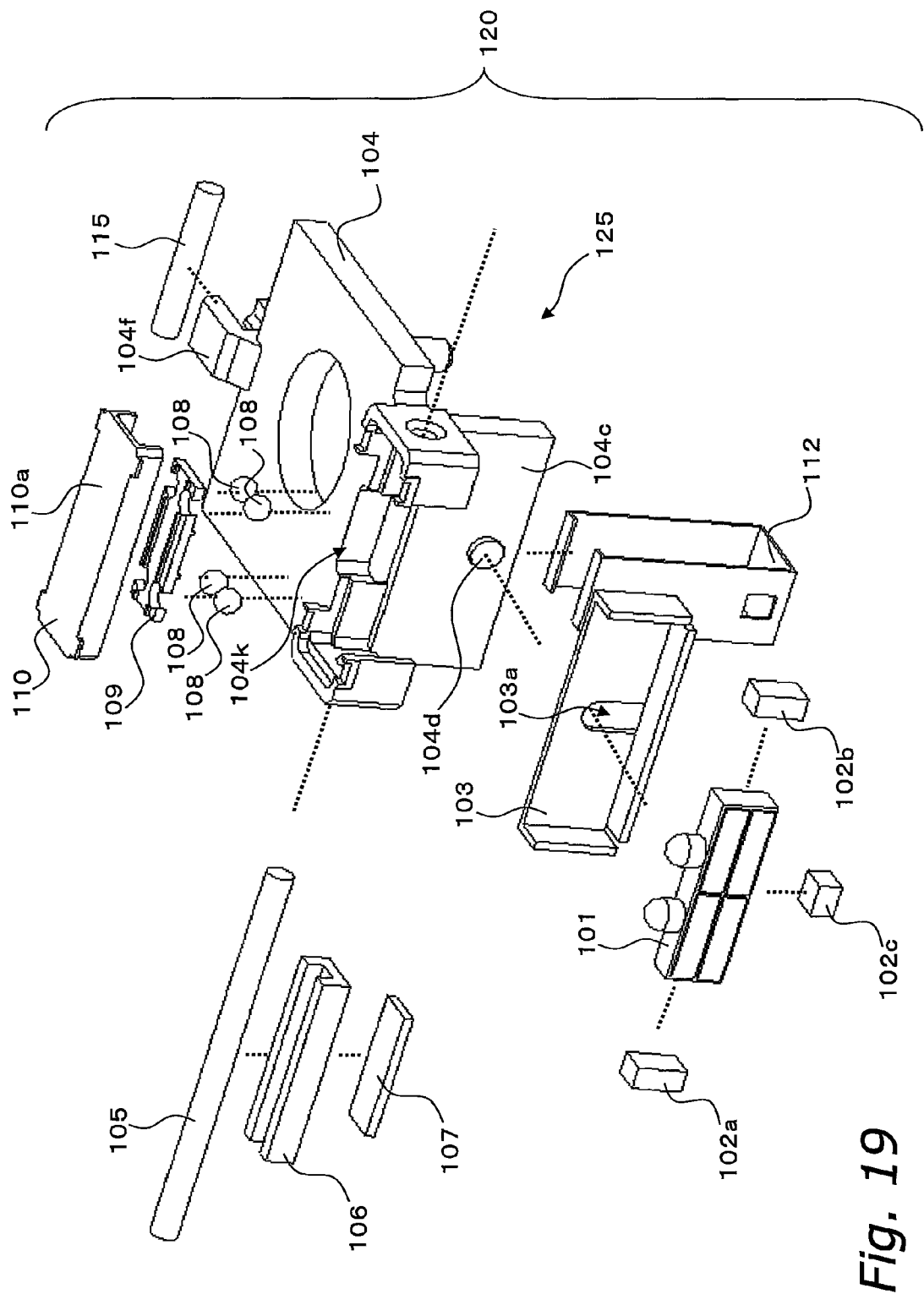
FIG. 19 is an exploded oblique view of another constitution of a drive apparatus (third embodiment)
Figure 20:
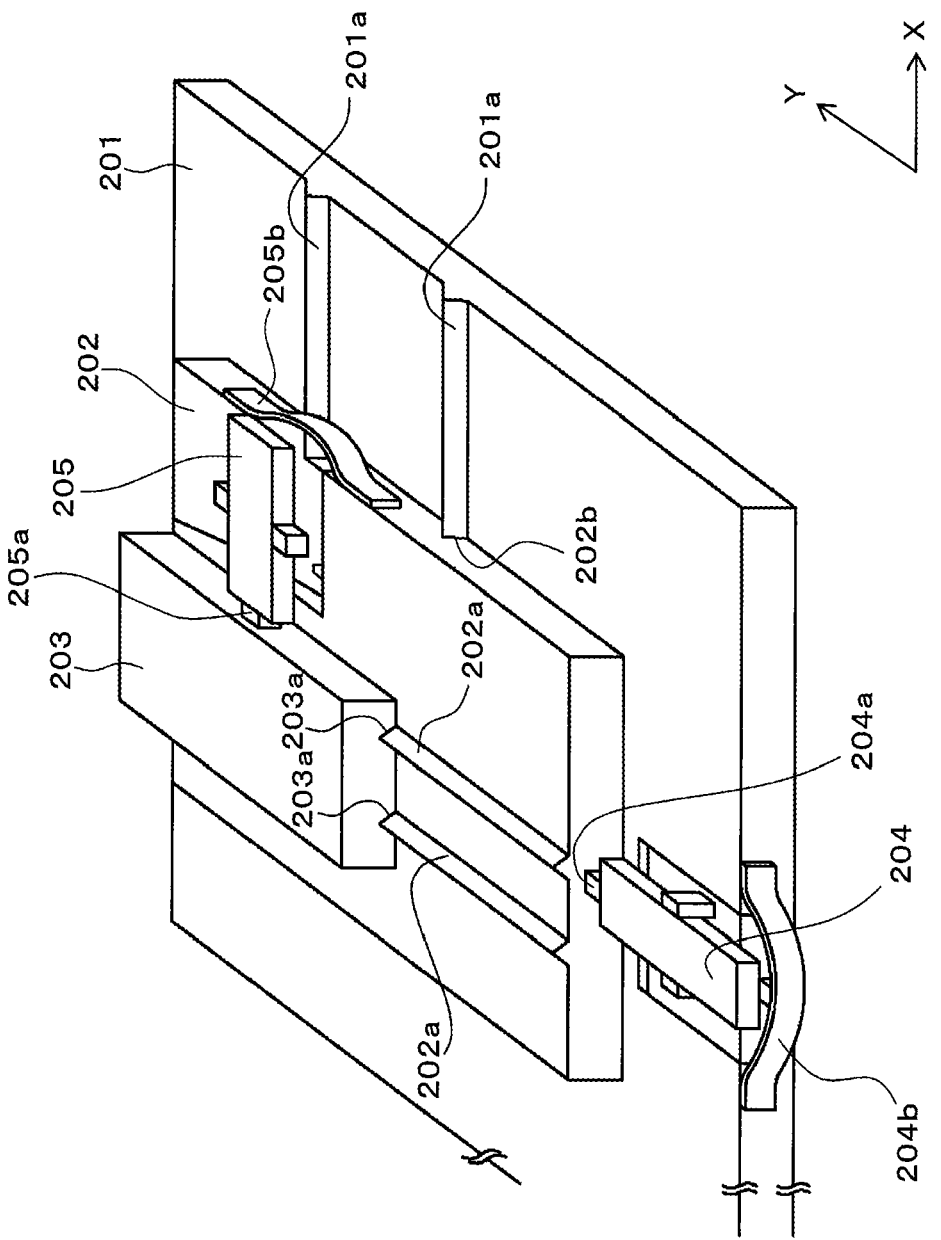
FIG. 20 is an oblique view of the constitution of a drive apparatus as prior art (prior art)

Also, as shown in FIG. 19, when the drive apparatus 120 has the pressing member 112, the receptacle 104e for supporting the actuator case 103 on the shaft 105 side (see FIG. 12) need not be formed on the main body 125. In this case, a bottom part of the U-shaped pressing member supports the actuator case 103 on the shaft 105 side. Also, one side part of the pressing member 112 is inserted into an opening 104k provided to the main body 125, and the other side part is disposed so as to cover the main face of the vibration actuator 101. Further, the prongs formed at the distal ends of the side parts are latched over the top face 110a of the guide rail 110.

What is claimed is:

1. A drive apparatus, comprising:
a first frame;
a second frame supported movably in a first direction with respect to the first frame;
a third frame supported movably in a second direction that intersects the first direction with respect to the second frame;
a first drive mechanism provided between the first frame and the second frame, and configured to move the first frame and the second frame relative to each other; and
a second drive mechanism provided between the second frame and the third frame, and configured to move the second frame and the third frame relative to each other,
wherein each of the first drive mechanism and the second drive mechanism has a drive generator configured to generate drive with a piezoelectric element, and a drive receiver that is pressed relative to the drive generator and receives the drive generated by the drive generator, and
the direction in which the drive generator acts on the drive receiver in the first drive mechanism is parallel and opposite to the direction in which the drive generator acts on the drive receiver in the second drive mechanism.

2. The drive apparatus according to claim 1, wherein the drive generator generates a standing wave in the piezoelectric element by combining longitudinal vibration with curved vibration, and thereby relatively drives the drive receiver.

3. The drive apparatus according to claim 2,
wherein a first main shaft extending in the first direction is provided to the first frame,
the second frame is provided with a first auxiliary shaft that extends in the first direction and is disposed on the second direction opposite side from the side on which the first main shaft is provided, a second main shaft that extends in the second direction, and a second auxiliary shaft that extends in the second direction and is disposed on the first direction opposite side from the side on which the second main shaft is provided, the first main shaft constitutes the drive receiver of the first drive mechanism, and the second main shaft constitutes the drive receiver of the second drive mechanism.

4. The drive apparatus according to claim 3, wherein an optical component is disposed on the third frame.

5. A drive apparatus, comprising:

a first frame;

a second frame supported movably in a first direction with respect to the first frame;

a third frame supported movably in a second direction that intersects the first direction with respect to the second frame;

a first drive mechanism provided between the first frame and the second frame, and configured to move the first frame and the second frame relative to each other; and a second drive mechanism provided between the second frame and the third frame, and configured to move the second frame and the third frame relative to each other, wherein each of the first drive mechanism and the second drive mechanism has a drive generator configured to generate drive with a piezoelectric element, and a drive receiver that is pressed relative to the drive generator and receives the drive generated by the drive generator, and the drive generator and the drive receiver had by each of the first drive mechanism and the second drive mechanism are disposed in the same plane parallel to the first direction and the second direction, and the direction in which the drive generator acts on the drive receiver in the first drive mechanism intersects in the same plane with the direction in which the drive generator acts on the drive receiver in the second drive mechanism.

6. A drive apparatus, comprising:

a drive generator configured to generate drive with a piezoelectric element;

a relative drive component configured to receive the drive generated by the drive generator and being driven relative to the drive generator;

a restrictor that is disposed opposite the drive generator with the relative drive component interposed therebetween, and restricts displacement of the relative drive component to the opposite side from the drive generator side where the drive generator acts; and a biaser that biases the drive generator and the restrictor in the direction of moving closer together.

7. The drive apparatus according to claim 6, wherein the restrictor has:

a rolling element that comes into rolling contact with the relative drive component;

a supporter that substantially supports the position of the rolling element; and a guide that is formed so as to cover the rolling element and the supporter from the opposite side from the relative drive component side, and guides the rolling element and the supporter.

8. The drive apparatus according to claim 7, wherein the guide is formed such that its cross section perpendicular to the relative drive direction of the drive generator and the relative drive component is substantially U-shaped, and the rolling element is disposed at two corners of the U shape, and is supported on two opposite sides of the U shape.

9. The drive apparatus according to claim 8, further comprising:

a main body that supports the drive generator and is driven relatively with the relative drive component, wherein a restrictor that restricts rotation of the guide around the relative drive component is provided to the guide.

10. The drive apparatus according to claim 9, wherein a sliding protrusion that slides with an opposing member is formed on at least one of the guide side and the relative drive component side of the supporter.

11. The drive apparatus according to claim 10, wherein the sliding protrusion on the relative drive component side of the supporter extends in a direction that intersects the direction in which the relative drive component is relatively driven.

12. The drive apparatus according to claim 11, wherein the sliding protrusion on the guide side of the supporter extends in the direction in which the relative drive component is relatively driven.

13. The drive apparatus according to claim 12, wherein a ceramic material is disposed at the place where the drive generator acts on the relative drive component.

14. The drive apparatus according to claim 13, further comprising:

a movement restrictor that restricts movement of the drive generator in a direction perpendicular to the direction in which the drive generator acts on the relative drive component.

* * * * *